(12) United States Patent
Negishi et al.

(10) Patent No.: US 9,637,684 B2
(45) Date of Patent: May 2, 2017

(54) COMPOSITION AND LIQUID CRYSTAL DISPLAY ELEMENT USING SAME

(71) Applicant: DIC Corporation, Tokyo (JP)

(72) Inventors: Makoto Negishi, Kita-adachi-gun (JP); Yoshinori Iwashita, Kita-adachi-gun (JP)

(73) Assignee: DIC CORPORATION, Tokyo (JP)

( * ) Notice: Subject to any disclaimer, the term of this patent is extended or adjusted under 35 U.S.C. 154(b) by 0 days.

(21) Appl. No.: 14/905,131

(22) PCT Filed: Sep. 4, 2014

(86) PCT No.: PCT/JP2014/073392
§ 371 (c)(1),
(2) Date: Jan. 14, 2016

(87) PCT Pub. No.: WO2015/037516
PCT Pub. Date: Mar. 19, 2015

(65) Prior Publication Data
US 2016/0145490 A1   May 26, 2016

(30) Foreign Application Priority Data

Sep. 12, 2013  (JP) ................................ 2013-189374

(51) Int. Cl.
| | | |
|---|---|---|
| G02F 1/1333 | (2006.01) | |
| C09K 19/34 | (2006.01) | |
| C09K 19/20 | (2006.01) | |
| C09K 19/42 | (2006.01) | |
| C09K 19/54 | (2006.01) | |
| C09K 19/04 | (2006.01) | |
| C09K 19/30 | (2006.01) | |

(52) U.S. Cl.
CPC .......... *C09K 19/3402* (2013.01); *C09K 19/20* (2013.01); *C09K 19/42* (2013.01); *C09K 19/54* (2013.01); *C09K 2019/0448* (2013.01); *C09K 2019/0466* (2013.01); *C09K 2019/3016* (2013.01); *C09K 2019/3422* (2013.01)

(58) Field of Classification Search
CPC .... C09K 19/3402; C09K 19/20; C09K 19/42; C09K 19/54; C09K 2019/0448; C09K 2019/0466; C09K 2019/3016; C09K 2019/3422

USPC .............. 252/299.01, 299.6, 299.61, 299.62; 349/182

See application file for complete search history.

(56) References Cited

U.S. PATENT DOCUMENTS

| | | |
|---|---|---|
| 2008/0029736 A1 | 2/2008 | Saito |
| 2008/0029737 A1 | 2/2008 | Saito |
| 2010/0302498 A1 | 12/2010 | Saito |
| 2011/0051023 A1 | 3/2011 | Fujita et al. |
| 2013/0134355 A1 | 5/2013 | Saito et al. |
| 2014/0198291 A1 | 7/2014 | Saito et al. |
| 2014/0306158 A1 | 10/2014 | Saito |

FOREIGN PATENT DOCUMENTS

| | | |
|---|---|---|
| CN | 103146392 A | 6/2013 |
| CN | 103254912 A | 8/2013 |
| CN | 103289708 A | 9/2013 |
| CN | 103361078 A | 10/2013 |
| JP | 2008-37918 A | 2/2008 |
| JP | 2008-38018 A | 2/2008 |
| JP | 2010-275390 A | 12/2010 |
| JP | 2011-52120 A | 3/2011 |
| JP | 2014-205791 A | 10/2014 |
| WO | 2012/020642 A1 | 2/2012 |
| WO | 2013/088980 A1 | 6/2013 |

OTHER PUBLICATIONS

International Search Report dated Dec. 9, 2014, issued in counterpart application No. PCT/JP2014/073392 (3 pages).

*Primary Examiner* — Geraldina Visconti
(74) *Attorney, Agent, or Firm* — Westerman, Hattori, Daniels & Adrian, LLP

(57) ABSTRACT

Provided is a composition which has a liquid phase over a wide temperature range, a low viscosity, an excellent solubility at low temperature, high specific resistance, high voltage retention rate, and stability against heat or light, and further a liquid crystal display element of, for example, such as an IPS type or a TN type, which has excellent display qualities by using the composition, and in which display defects such as burn-in or drip marks are hardly caused, at a high yield. Provided is a composition including one or more compounds represented by General Formula (i), one or more compounds represented by General Formula (M-1), and one or more compounds represented by General Formula (M-4), and a liquid crystal display element using the composition.

9 Claims, No Drawings

COMPOSITION AND LIQUID CRYSTAL DISPLAY ELEMENT USING SAME

TECHNICAL FIELD

The present invention relates to a composition which has a positive dielectric anisotropy (Δ∈) value and is useful as a liquid crystal display material, and a liquid crystal display element using the composition.

BACKGROUND ART

A liquid crystal display element is used for a clock, a calculator, various measuring apparatuses, a panel for automobiles, a word processor, an electronic notebook, a printer, a computer, a television, a clock, an advertisement display board, or the like. Representative examples of a liquid crystal display mode include a TN (twisted nematic) type, a STN (super twisted nematic) type, a vertical alignment type using a TFT (thin film transistor), and an IPS (in plane switching) type. A liquid crystal composition used in these liquid crystal display elements is required to have stability against external stimuli such as moisture, air, heat, or light, a liquid crystal phase over a temperature range as wide as possible around room temperature, low viscosity, and low driving voltage. Further, the liquid crystal composition is composed of several to several tens of types of compounds so that respective display elements have an optimal value of dielectric anisotropy (Δ∈) and/or refractive index anisotropy (Δn).

In the vertical alignment (VA) type display, a liquid crystal composition having a negative Δ∈ is used, and in the horizontal alignment type display such as the TN type, STN type, or IPS (in plane switching) type, a liquid crystal composition having a positive Δ∈ is used. In addition, a driving mode in which a liquid crystal composition having a positive Δ∈ is vertically aligned when no voltage is applied, and a horizontal electric field is applied thereto for displaying has been reported, and the necessity of the liquid crystal composition having a positive Δ∈ has been further increased. Meanwhile, in all of the driving modes, low voltage driving, high-speed responsiveness, and a wide operational temperature range are required. Specifically, a positive Δ∈ having a high absolute value, a low viscosity (η), and a high nematic phase-isotropic liquid phase transition temperature (Tni) are required. In addition, from the setting of Δn×d, which is a product of Δn and a cell gap (d), it is necessary to adjust the Δn of the liquid crystal composition in an appropriate range according to the cell gap. In addition, since high-speed responsiveness is important in a case where the liquid crystal display element is applied to a television or the like, the liquid crystal composition having a low rotational viscosity (γ1) is required.

As a configuration of the liquid crystal composition aimed for high-speed responsiveness, for example, a liquid crystal composition is disclosed, which uses a compound represented by Formula (A-1) or (A-2), which is a liquid crystal compound having a positive Δ∈, and a liquid crystal compound (B) having a neutral Δ∈ in combination (PTL 1 to PTL 4).

[Chem. 1]

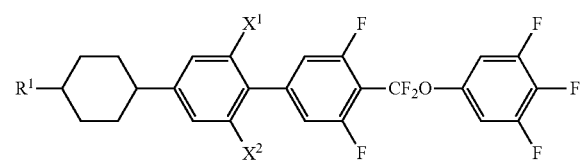

(A-1)

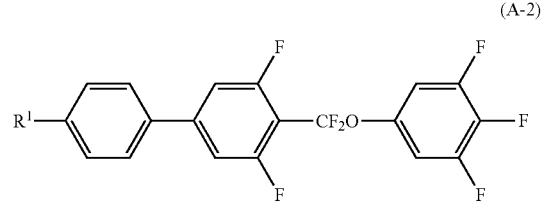

(A-2)

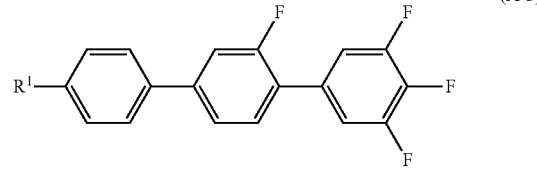

(A-3)

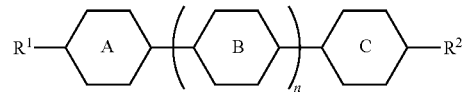

(B)

Meanwhile, as the use of the liquid crystal display element is widened, there has been a great change in the using method and manufacturing method of the liquid crystal display element. In order to cope with this change, it is required to optimize properties other than the basic physical property values which have been known in the related art. In other words, as the liquid crystal display element which uses the liquid crystal composition, the VA type or the IPS type becomes widely used, and the display element having a super large size of 50 or more becomes practically used. Along with the increase in size of a substrate, as to a method of injecting the liquid crystal composition to the substrate, the mainstream has been changed from a vacuum injection method in the related art to a one drop fill (ODE) method. However, a problem has occurred in which drip marks at the time of dropping the liquid crystal composition to the substrate degrade display quality. Further, in the process of manufacturing the liquid crystal display element by the ODE method, it is necessary to drop an optimal liquid crystal injection amount according to the size of the liquid crystal display element. When there is a large difference between the injection amount and the optimal value, a balance of the refractive index or the driving electric field of the liquid crystal display element, which is set in advance, is lost, and display defects such as occurrence of spots or contrast failure occur. In particular, in the small-sized liquid crystal display element which is often used for a smart phone which has been popular recently, since the optimal liquid crystal injection amount is small, it is difficult to control a difference from the optimal value within a certain range. Therefore, in order to maintain a high yield of the liquid crystal display element, for example, it is necessary that the liquid crystal display element is less affected by a drastic pressure change or shock in a dropping device occurring at the time of dropping the liquid crystal, and the liquid crystal can be dropped continuously and stably for a long period of time.

As such, in the liquid crystal composition used for an active matrix driving liquid crystal display element which is driven by the TFT element, a development of the composition is required, in consideration of a manufacturing method of the liquid crystal display element, in addition to properties such as a high specific resistance value or high voltage retention rate, which has been important conventionally, and stability against external stimuli such as light or heat, while maintaining properties or performances such as high-speed responsiveness, which have been required as the liquid crystal display element.

CITATION LIST

Patent Literature

[PTL 1] JP-A-2008-037918
[PTL 2] JP-A-2008-038018
[PTL 3] JP-A-2010-275390
[PTL 4] JP-A-2011-052120

SUMMARY OF INVENTION

Technical Problem

An object of the present invention is to provide a composition which has a positive $\Delta\varepsilon$, a liquid crystal phase over a wide temperature range, a low viscosity, an excellent solubility at low temperature, high specific resistance, high voltage retention rate, and stability against heat or light, and further provide, at a high yield, a liquid crystal display element such as an IPS type or a TN type, which has excellent display qualities by using the composition, and in which display defects such as burn-in or drip marks are hardly caused.

Solution to Problem

The present inventors have reviewed various liquid crystal compounds and various chemical substances, and found that the above mentioned problem can be solved by combining a particular liquid crystal compound, and completed the present invention.

[1] A composition including one or more compounds represented by General Formula (i), one or more compounds represented by General Formula (M-1), and one or more compounds represented by General Formula (M-4).

[Chem. 2]

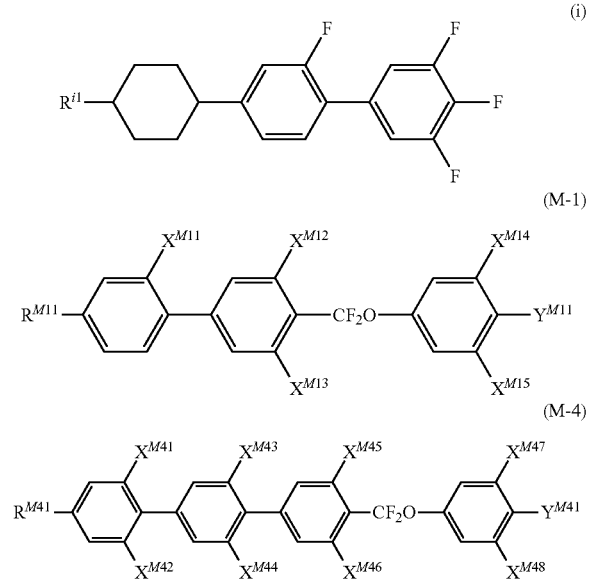

(In the formulas, $R^{i1}$, $R^{M11}$ and $R^{M41}$ each independently represent an alkyl group having 1 to 8 carbon atoms, one —$CH_2$— or two or more non-adjacent —$CH_2$—'s in the alkyl group each independently may be substituted with —CH=CH—, —C≡C—, —O—, —CO—, —COO—, or —OCO—, $X^{M11}$ to $X^{M15}$ and $X^{M41}$ to $X^{M48}$ each independently represent a hydrogen atom, a fluorine atom, or a chlorine atom, and $Y^{M11}$ and $Y^{M41}$ each independently represent a fluorine atom or —$OCF_3$.)

[2] The composition according to [1] in which $R^{i1}$, $R^{M11}$, and $R^{M41}$ represent a propyl group.

[3] The composition according to [1] or [2] further including one or more compounds represented by General Formula (L).

[Chem. 3]

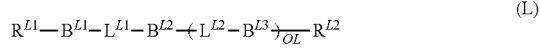

(L)

(In the formula, $R^{L1}$ and $R^{L2}$ each independently represent an alkyl group having 1 to 8 carbon atoms, one —$CH_2$— or two or more non-adjacent —$CH_2$—'s in the alkyl group each independently may be substituted with —CH=CH—, —C≡C—, —O—, —CO—, —COO—, or —OCO—, OL represents 0, 1, 2, or 3, $B^{L1}$, $B^{L2}$, and $B^{L3}$ each independently represent a group selected from the group consisting of (a) a 1,4-cyclohexylene group (one —$CH_2$— or two or more non-adjacent —$CH_2$—'s existing in this group may be substituted with —O—) and (b) a 1,4-phenylene group (one —CH= or two or more non-adjacent —CH='s existing in this group may be substituted with —N=), the group (a) and the group (b) each independently may be substituted with a cyano group, a fluorine atom, or a chlorine atom, $L^{L1}$ and $L^{L2}$ each independently represent a single bond, —$CH_2CH_2$—, —$(CH_2)_4$—, —$OCH_2$—, —$CH_2O$—, —COO—, —OCO—, —$OCF_2$—, —$CF_2O$—, —CH=N—N=CH—, —CH=CH—, —CF=CF—, or —C≡C—, when OL is 2 or 3 and a plurality of $L^{L2}$'s exist, the plurality of $L^{L2}$'s may be the same as or different from each other, and when OL is 2 or 3 and a plurality of $B^{L3}$'s exist, the plurality of $B^{L3}$'s may be the same as or different from each other.)

[4] The composition according to any one of [1] to [3], further including one or more compounds represented by General Formula (M).

[Chem. 4]

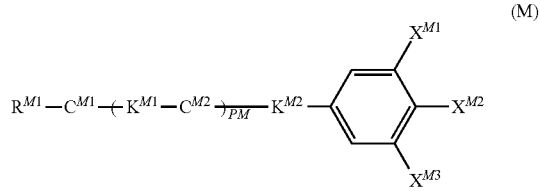

(M)

(In the formula, $R^{M1}$ represents an alkyl group having 1 to 8 carbon atoms, one —$CH_2$— or two or more non-adjacent —$CH_2$—'s in the alkyl group each independently may be substituted with —CH=CH—, —C≡C—, —O—, —CO—, —COO—, or —OCO—, PM represents 0, 1, 2, 3, or 4, $C^{M1}$ and $C^{M2}$ each independently represent a group selected from the group consisting of (d) a 1,4-cyclohexylene group (one —$CH_2$— or two or more non-adjacent —$CH_2$—'s existing in this group may be substituted with —O— or —S—) and (e) a 1,4-phenylene group (one —CH= or two or more non-adjacent —CH='s existing in this group may be substituted with —N=), the group (d) and the group (e) each independently may be substituted with a cyano group, a fluorine atom, or a chlorine atom, $K^{M1}$ and $K^{M2}$ each independently represent a single bond, —CH$_2$CH$_2$—, —(CH$_2$)$_4$—, —OCH$_2$—, —CH$_2$O—, —OCF$_2$—, —CF$_2$O—, —COO—, —OCO—, or —C≡C—, when PM is 2, 3, or 4 and a plurality of $K^{M1}$'s exist, the plurality of $K^{M1}$'s may be the same as or different from each other, when PM is 2, 3, or 4 and a plurality of $C^{M2}$'s exist, the plurality of $C^{M2}$'s may be the same as or different from each other, $X^{M1}$ and $X^{M3}$ each independently represent a hydrogen atom, a chlorine atom, or a fluorine atom, and $X^{M2}$ represents a hydrogen atom, a fluorine atom, a chlorine atom, a cyano group, a trifluoromethyl group, a fluoromethoxy group, a difluoromethoxy group, a trifluoromethoxy group, or a 2,2,2-trifluoroethyl group. Here, the compound represented by General Formula (i), the compound represented by General Formula (M-1), and the compound represented by General Formula (M-4) are excluded.)

[5] A liquid crystal display element using the composition according to [1].

[6] An IPS element or an FFS element using the composition according to [1].

As the compound represented by General Formula (i), compounds represented by Formula (M-6.31) to Formula (M-6.34) are preferable. Among the above, compounds represented by Formula (M-6.31) and Formula (M-6.32) are preferably contained.

[Chem. 5]

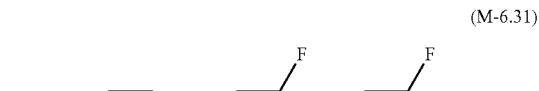

(M-6.31)

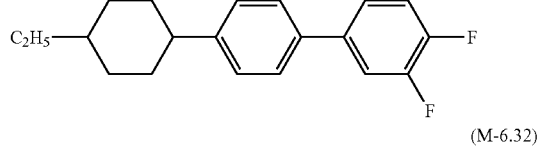

(M-6.32)

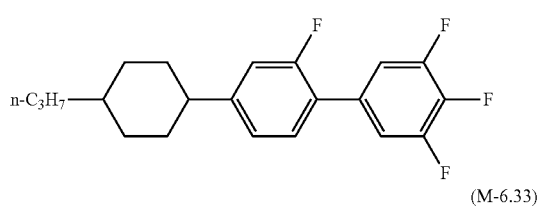

(M-6.33)

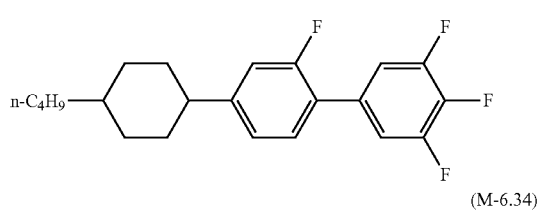

(M-6.34)

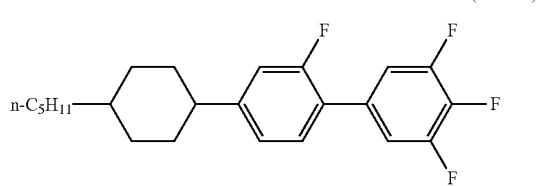

A lower limit of a preferable content of the compounds with respect to a total amount of the composition of the present invention is 1%, 2%, 4%, 5%, 8%, 10%, 13%, 15%, 18%, or 20%. An upper limit of the preferable content is 30%, 28%, 25%, 23%, 20%, 18%, 15%, 13%, 10%, 8%, or 5%.

In the compound represented by General Formula (M-1), $R^{M11}$ is preferably an alkyl group having 1 to 5 carbon atoms, an alkenyl group having 2 to 5 carbon atoms, or an alkoxy group having 1 to 4 carbon atoms, in $X^{M11}$ to $X^{M15}$, 3 or more thereof are preferably fluorine atoms, and 4 or more thereof are preferably fluorine atoms, and $Y^{M11}$ is preferably a fluorine atom or OCF$_3$.

A type of the compound which can be combined is not particularly limited, and the compound is used in combination according to desired performances such as solubility at low temperature, transition temperature, electrical reliability, and birefringence. The number of the type of the compound to be used is, for example, 1, 2, or 3 or more, for one embodiment of the present invention.

A lower limit of a preferable content of the compound represented by Formula (M-1) with respect to a total amount of the composition of the present invention is 1%, 2%, 5%, 8%, 10%, 13%, 15%, 18%, 20%, 22%, 25%, or 30%. An upper limit of the preferable content is 30%, 28%, 25%, 23%, 20%, 18%, 15%, 13%, 10%, 8%, or 5%.

In a case where a composition which has a high response speed is required, while maintaining low viscosity of the composition of the present invention, it is preferable to decrease the lower limit and the upper limit. Further, in a case where a composition which has excellent temperature stability is required, while maintaining high Tni of the composition of the present invention, it is preferable to decrease the lower limit and the upper limit. In addition, when high dielectric anisotropy is desired in order to maintain low driving voltage, it is preferable to increase the lower limit and the upper limit.

Further, as the compound represented by General Formula (M-1), specifically compounds represented by Formula (M-1.1) to Formula (M-1.4) are preferable, a compound represented by Formula (M-1.1) or Formula (M-1.2) is preferable, and a compound represented by Formula (M-1.2) is more preferable. In addition, the compound represented by Formula (M-1.1) or Formula (M-1.2) is preferably used at the same time.

[Chem. 6]

(M-1.1)

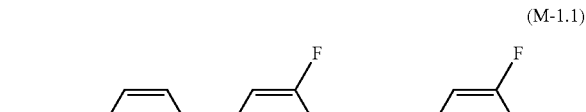

(M-1.2)

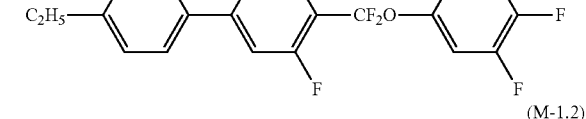

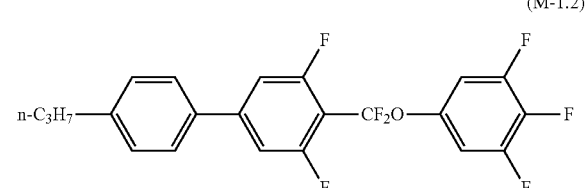

-continued

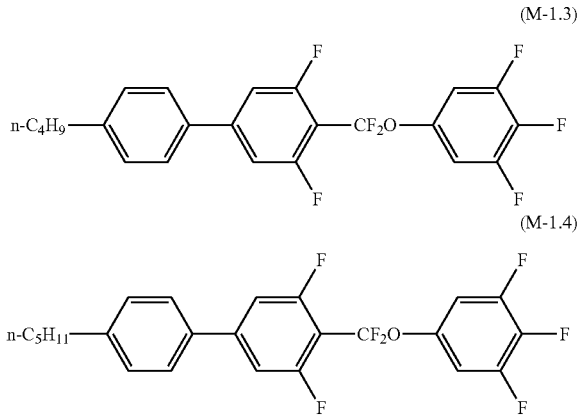

(M-1.3)

(M-1.4)

A lower limit of a preferable content of the compound represented by Formula (M-1.1) with respect to a total amount of the composition of the present invention is 1%, 2%, 5%, or 6%. An upper limit of the preferable content is 15%, 13%, 10%, 8%, or 5%.

A lower limit of a preferable content of the compound represented by Formula (M-1.2) with respect to a total amount of the composition of the present invention is 1%, 2%, 5%, or 6%. An upper limit of the preferable content is 30%, 25%, 23%, 20%, 18%, 15%, 13%, 10%, or 8%.

A lower limit of a preferable total content of the compounds represented by Formula (M-1.1) and Formula (M-1.2) with respect to a total amount of the composition of the present invention is 1%, 2%, 5%, and 6%. An upper limit of the preferable content is 30%, 25%, 23%, 20%, 18%, 15%, 13%, 10%, or 8%.

In the compound represented by General Formula (M-4), $R^{M41}$ is preferably an alkyl group having 1 to 5 carbon atoms, an alkenyl group having 2 to 5 carbon atoms, or an alkoxy group having 1 to 4 carbon atoms, in $X^{M41}$ to $X^{M48}$, 3 or more thereof are preferably fluorine atoms, and 4 or more thereof are preferably fluorine atoms, and $Y^{M41}$ is preferably a fluorine atom or $OCF_3$.

A compound which can be combined is not particularly limited, and 1, 2, or 3 or more types of the compound is preferably combined in consideration of solubility at low temperature, transition temperature, electrical reliability, and birefringence.

A content of the compound represented by General Formula (M-4) has an upper limit and a lower limit for each embodiment, in consideration of properties such as solubility at low temperature, transition temperature, electrical reliability, and birefringence.

A lower limit of a preferable content of the compound represented by Formula (M-4) with respect to a total amount of the composition of the present invention is 1%, 2%, 4%, 5%, 8%, 10%, 13%, 15%, 18%, or 20%. An upper limit of the preferable content is 30%, 28%, 25%, 23%, 20%, 18%, 15%, 13%, 10%, 8%, or 5%.

In a case where the composition of the present invention is used for a liquid crystal display element having a small cell gap, it is appropriate to increase the content of the compound represented by General Formula (M-4). In a case where the composition is used for a liquid crystal display element having low driving voltage, it is appropriate to increase the content of the compound represented by General Formula (M-4). In addition, in a case where the composition is used for a liquid crystal display element used in a low temperature environment, it is appropriate to decrease the content of the compound represented by General Formula (M-4). In a case where the composition is used for a liquid crystal display element having a high response speed, it is appropriate to decrease the content of the compound represented by General Formula (M-4).

Further, as the compound represented by General Formula (M-4) used in the composition of the present invention, specifically, compounds represented by Formula (M-4.1) to Formula (M-4.4) are preferable, among the above, the compounds represented by Formula (M-4.2) to Formula (M-4.4) are preferably contained, and the compound represented by Formula (M-4.2) is more preferably contained.

[Chem. 7]

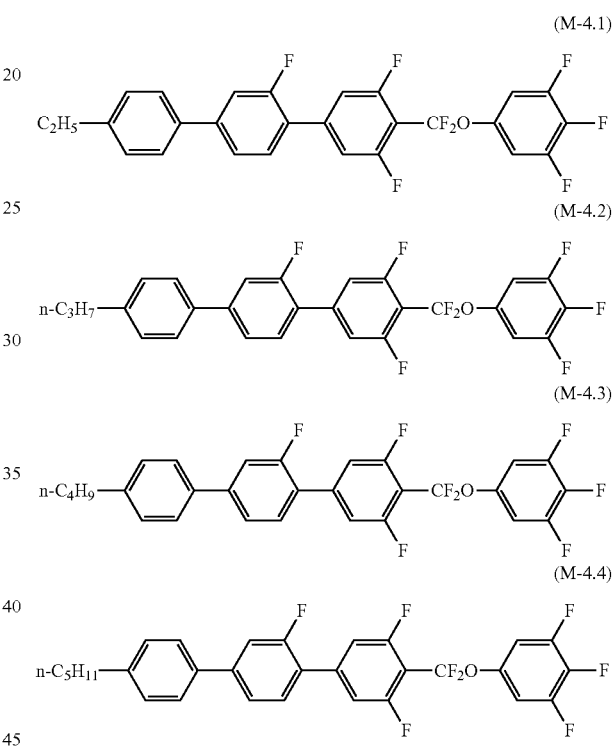

(M-4.1)

(M-4.2)

(M-4.3)

(M-4.4)

Advantageous Effects of Invention

Since the composition having a positive dielectric anisotropy of the present invention has a considerably low viscosity and excellent solubility at low temperature, and specific resistance or voltage retention rate thereof is extremely less affected by heat or light, the product is highly practical, and the liquid crystal display element such as that of an IPS type or an FFS type using the composition can achieve high-speed responsiveness. In addition, since the composition can exhibit stable performance in the process of manufacturing the liquid crystal display element, display defects caused by the process can be suppressed, and the element can be manufactured at high yield, which means that the composition is very useful.

DESCRIPTION OF EMBODIMENTS

The composition of the present invention preferably exhibits a liquid crystal phase at room temperature (25° C.), and more preferably exhibits a nematic phase. In addition, the composition of the present invention includes an approximately dielectrically neutral compound (a value of $\Delta\epsilon$ is −2 to 2) and a dielectrically positive compound (a value of $\Delta\epsilon$ is greater than 2). In addition, dielectric anisotropy of the compound is a value extrapolated from the measurement value of the dielectric anisotropy of the composition, which is prepared by adding the compound to an approximately dielectrically neutral composition at a temperature of 25° C. In addition, the following content is described using %, which means %.

The composition of the present invention may include one or more compounds represented by General Formula (L). The compound represented by General Formula (L) corresponds to an approximately dielectrically neutral compound (a value of $\Delta\epsilon$ is −2 to 2).

[Chem. 8]

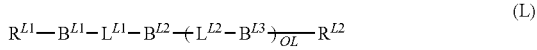

(L)

(In the formula, $R^{L1}$ and $R^{L2}$ each independently represent an alkyl group having 1 to 8 carbon atoms, one —$CH_2$— or two or more non-adjacent —$CH_2$—'s in the alkyl group each independently may be substituted with —CH=CH—, —C≡C—, —O—, —CO—, —COO—, or —OCO—, OL represents 0, 1, 2, or 3, $B^{L1}$, $B^{L2}$, and $B^{L3}$ each independently represent a group selected from the group consisting of (a) a 1,4-cyclohexylene group (one —$CH_2$— or two or more non-adjacent —$CH_2$—'s existing in this group may be substituted with —O—) and (b) a 1,4-phenylene group (one —CH= or two or more non-adjacent —CH=′s existing in this group may be substituted with —N=), the group (a) and the group (b) each independently may be substituted with a cyano group, a fluorine atom, or a chlorine atom, $L^{L1}$ and $L^{L2}$ each independently represent a single bond, —$CH_2CH_2$—, —$(CH_2)_4$—, —$OCH_2$—, —$CH_2O$—, —COO—, —OCO—, —$OCF_2$—, —$CF_2O$—, —CH=N—N=CH—, —CH=CH—, —CF=CF—, or —C≡C—, when OL is 2 or 3 and a plurality of $L^{L2}$'s exist, the plurality of $L^{L2}$'s may be the same as or different from each other, and when OL is 2 or 3 and a plurality of $B^{L3}$'s exist, the plurality of $B^{L3}$'s may be the same as or different from each other.)

The compound represented by General Formula (L) may be used singly, or in combination. A type of the compound which can be combined is not particularly limited, and the compound is used in appropriate combination according to desired performances such as solubility at low temperature, transition temperature, electrical reliability, and birefringence. The number of the type of the compound to be used is, for example, 1 for one embodiment of the present invention. Alternatively, in another embodiment of the present invention, the number of the type of the compound to be used is 2, 3, 4, 5, 6, 7, 8, 9, or 10 or more.

In the composition of the present invention, it is necessary that the content of the compound represented by General Formula (L) is appropriately adjusted according to the required performances such as solubility at low temperature, transition temperature, electrical reliability, birefringence, process adaptability, drip marks, burn-in, and dielectric anisotropy.

A lower limit of a preferable content of the compound represented by Formula (L) with respect to a total amount of the composition of the present invention is 1%, 10%, 20%, 30%, 40%, 50%, 55%, 60%, 65%, 70%, 75%, or 80%. An upper limit of the preferable content is 95%, 85%, 75%, 65%, 55%, 45%, 35%, or 25%.

In a case where a composition having a high response speed is needed, while maintaining low viscosity of the composition of the present invention, the lower limit is preferably high, and the upper limit is preferably high. Further, in a case where a composition having excellent temperature stability is needed, while maintaining high Tni of the composition of the present invention, the lower limit is preferably high, and the upper limit is preferably high. In addition, in a case where dielectric anisotropy is needed to be increased in order to maintain low driving voltage, the lower limit is preferably low, and the upper limit is preferably low.

In a case of putting importance on reliability, both $R^{L1}$ and $R^{L2}$ are preferably an alkyl group, and in a case of putting importance on low viscosity, at least one of the above is preferably an alkenyl group.

In a case where a ring structure to which $R^{L1}$ and $R^{L2}$ are bonded is a phenyl group (aromatic group), $R^{L1}$ and $R^{L2}$ are preferably a linear alkyl group having 1 to 5 carbon atoms, a linear alkoxy group having 1 to 4 carbon atoms, and an alkenyl group having 4 to 5 carbon atoms, and in a case where a ring structure to which $R^{L1}$ and $R^{L2}$ are bonded is a saturated ring structure such as cyclohexane, pyran, and dioxane, $R^{L1}$ and $R^{L2}$ are preferably a linear alkyl group having 1 to 5 carbon atoms, a linear alkoxy group having 1 to 4 carbon atoms, and a linear alkenyl group having 2 to 5 carbon atoms.

The compound represented by General Formula (L) is preferably a compound selected from the compound group represented by General Formula (L-1).

[Chem. 9]

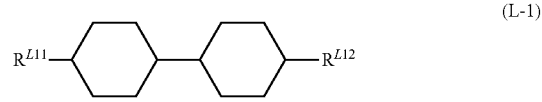

(L-1)

(In the formula, $R^{L11}$ and $R^{L12}$ each independently represent a linear alkyl group having 1 to 5 carbon atoms, a linear alkoxy group having 1 to 4 carbon atoms, and a linear alkenyl group having 2 to 5 carbon atoms.)

A type of the compound which can be combined is not particularly limited, and the compound is used in appropriate combination according to desired performances such as solubility at low temperature, transition temperature, electrical reliability, and birefringence. The number of the type of the compound to be used is, for example, 1, 2, 3, 4, or 5 or more, for one embodiment of the present invention.

A lower limit of a preferable content with respect to a total amount of the composition of the present invention is 1%, 2%, 3%, 5%, 7%, 10%, 15%, 20%, 25%, 30%, 35%, 40%, 45%, 50%, or 55%. An upper limit of the preferable content with respect to a total amount of the composition of the present invention is 95%, 90%, 85%, 80%, 75%, 70%, 65%, 60%, 55%, 50%, 45%, 40%, 35%, 30%, or 25%.

In a case where a composition having a high response speed is required, while maintaining low viscosity of the composition of the present invention, the lower limit is preferably high and the upper limit is preferably high. Further, in a case where a compound having excellent temperature stability is required, while maintaining high Tni of the composition of the present invention, the lower limit preferably has an intermediate value and the upper limit preferably has an intermediate value. In addition, in a case where dielectric anisotropy is needed to be increased in order to maintain low driving voltage, the lower limit is preferably low and the upper limit is preferably low.

Further, the compound represented by General Formula (L-1) is preferably a compound selected from the compound group represented by General Formula (L-1-1).

[Chem. 10]

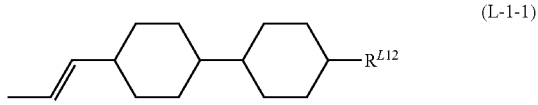

(L-1-1)

(In the formula, $R^{L12}$ represents the same meaning as the meaning in General Formula (L-1).)

Further, the compound represented by General Formula (L-1-1) is preferably a compound selected from the compound group represented by Formula (L-1-1.1) to Formula (L-1-1.3), preferably a compound represented by Formula (L-1-1.2) or Formula (L-1-1.3), and particularly preferably a compound represented by Formula (L-1-1.3).

[Chem. 11]

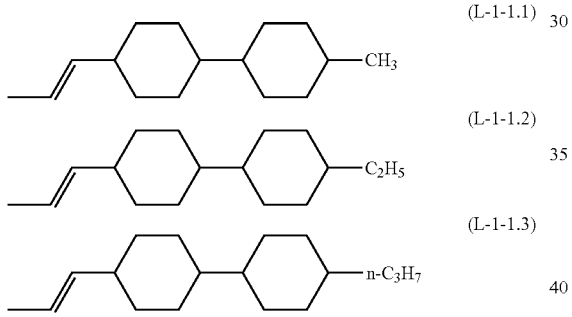

(L-1-1.1)

(L-1-1.2)

(L-1-1.3)

A lower limit of a preferable content of the compound represented by Formula (L-1-1.3) with respect to a total amount of the composition of the present invention is 1%, 2%, 3%, 5%, 7%, or 10%. An upper limit of the preferable content with respect to a total amount of the composition of the present invention is 20%, 15%, 13%, 10%, 8%, 7%, 6%, 5%, or 3%.

Further, the compound represented by General Formula (L-1) is preferably a compound selected from the compound group represented by General Formula (L-1-2).

[Chem. 12]

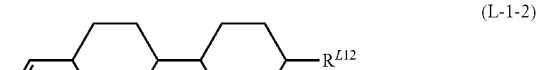

(L-1-2)

(In the formula, $R^{L12}$ represents the same meaning as the meaning in General Formula (L-1).)

A lower limit of a preferable content of the compound represented by Formula (L-1-2) with respect to a total amount of the composition of the present invention is 1%, 5%, 10%, 15%, 20%, or 30%. An upper limit of the preferable content with respect to a total amount of the composition of the present invention is 60%, 55%, 50%, 45%, 40%, 35%, 33%, or 30%.

Further, the compound represented by General Formula (L-1-2) is preferably a compound selected from the compound group represented by Formula (L-1-2.1) to Formula (L-1-2.4), and preferably one of the compounds represented by Formula (L-1-2.2) to Formula (L-1-2.4). In particular, the compound represented by Formula (L-1-2.2) is preferable since it particularly improves the response speed of the composition of the present invention. In addition, when high Tni is required rather higher than the response speed is required, the compound represented by Formula (L-1-2.3) or Formula (L-1-2.4) is preferably used. It is not preferable to set the content of the compounds represented by Formula (L-1-2.3) and Formula (L-1-2.4) to 30% or more, in order to improve solubility at low temperature.

[Chem. 13]

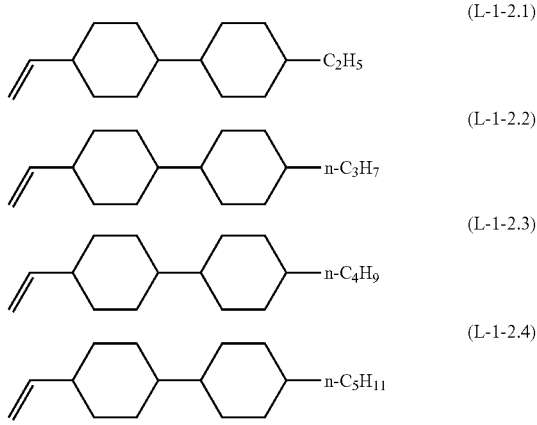

(L-1-2.1)

(L-1-2.2)

(L-1-2.3)

(L-1-2.4)

A lower limit of a preferable content of the compound represented by Formula (L-1-2.2) with respect to a total amount of the composition of the present invention is 10%, 15%, 20%, 25%, 27%, 30%, 35%, or 40%. An upper limit of the preferable content with respect to a total amount of the composition of the present invention is 60%, 55%, 50%, 45%, 43%, 40%, 38%, 35%, 32%, 30%, 27%, 25%, or 22%.

A lower limit of a preferable total content of the compounds represented by Formula (L-1-1.3) and the compound represented by Formula (L-1-2.2) with respect to a total amount of the composition of the present invention is 10%, 15%, 20%, 25%, 27%, 30%, 35%, or 40%. An upper limit of the preferable content with respect to a total amount of the composition of the present invention is 60%, 55%, 50%, 45%, 43%, 40%, 38%, 35%, 32%, 30%, 27%, 25%, or 22%.

Further, the compound represented by General Formula (L-1) is preferably a compound selected from the compound group represented by General Formula (L-1-3).

[Chem. 14]

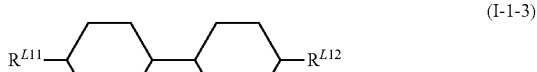

(I-1-3)

(In the formula, $R^{L11}$ and $R^{L12}$ represent the same meaning as the meaning in General Formula (L-1).)

A type of the compound which can be combined is not particularly limited, and the compound is combined according to desired performances such as solubility at low temperature, transition temperature, electrical reliability, and birefringence. The number of the type of the compound to be used is, for example, 1, 2, or 3 for one embodiment of the present invention.

In the composition of the present invention, it is necessary that the content of the compound represented by General Formula (L-1-3) is appropriately adjusted according to the required performances such as solubility at low temperature, transition temperature, electrical reliability, birefringence, process adaptability, drip marks, burn-in, and dielectric anisotropy.

A lower limit of a preferable content of the compound represented by Formula (L-1-3) with respect to a total amount of the composition of the present invention is 1%, 5%, 10%, 15%, 20%, or 30%. An upper limit of the preferable content with respect to a total amount of the composition of the present invention is 60%, 55%, 50%, 45%, 40%, 35%, 33%, or 30%. Further, the compound represented by General Formula (L-1-3) is preferably a compound selected from the compound group represented by Formula (L-1-3.1) to Formula (L-1-3.4), and preferably a compound represented by Formula (L-1-3.1), Formula (L-1-3.3), or Formula (L-1-3.4). In particular, the compound represented by Formula (L-1-3.1) is preferable since it particularly improves the response speed of the composition of the present invention. In addition, when high Tni is required rather than the response speed, the compound represented by Formula (L-1-3.3) or Formula (L-1-3.4) is preferably used. It is not preferable to set the content of the compounds represented by Formula (L-1-3.3) and Formula (L-1-3.4) to 20% or more in order to improve solubility at low temperature.

[Chem. 15]

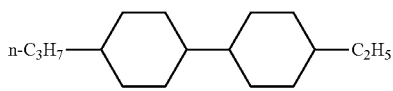
(L-1-3.1)

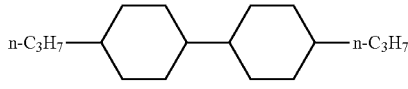
(L-1-3.2)

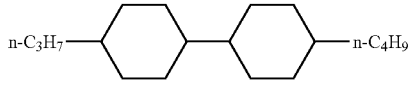
(L-1-3.3)

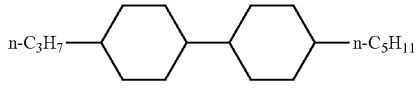
(L-1-3.4)

A lower limit of a preferable content of the compound represented by Formula (L-1-3.1) with respect to a total amount of the composition of the present invention is 1%, 2%, 3%, 5%, 7%, or 10%. An upper limit of the preferable content with respect to a total amount of the composition of the present invention is 20%, 15%, 13%, 10%, 8%, 7%, 6%, 5%, or 3%.

Further, the compound represented by General Formula (L) is preferably a compound selected from the compound group represented by General Formula (L-2).

[Chem. 16]

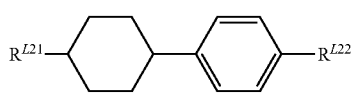
(L-2)

(In the formula, $R^{L21}$ represents an alkyl group having 1 to 5 carbon atoms or an alkenyl group having 2 to 5 carbon atoms, and $R^{L22}$ represents an alkyl group having 1 to 5 carbon atoms, an alkenyl group having 4 to 5 carbon atoms, or an alkoxy group having 1 to 4 carbon atoms.)

A type of the compound which can be combined is not particularly limited, and the compound is combined according to the required performances such as solubility at low temperature, transition temperature, electrical reliability, and birefringence. The number of the type of the compound to be used is, for example, 1 or 2 for one embodiment of the present invention.

In the composition of the present invention, it is necessary that the content of the compound represented by General Formula (L-2) is appropriately adjusted according to the required performances such as solubility at low temperature, transition temperature, electrical reliability, birefringence, process adaptability, drip marks, burn-in, and dielectric anisotropy.

In a case of putting importance on solubility at low temperature, it is highly effective to set the content to a great amount, and in contrast, in a case of putting importance on the response speed, it is highly effective to set the content to a small amount. Further, in a case of improving drip marks or burn-in properties, it is preferable to set the content in an intermediate range.

A lower limit of a preferable content of the compound represented by Formula (L-2) with respect to a total amount of the composition of the present invention is 1%, 2%, 3%, 5%, 7%, or 10%. An upper limit of the preferable content with respect to a total amount of the composition of the present invention is 20%, 15%, 13%, 10%, 8%, 7%, 6%, 5%, or 3%.

Further, the compound represented by General Formula (L-2) is preferably a compound selected from the compound group represented by Formula (L-2.1) to Formula (L-2.6), and preferably one of the compounds represented by Formula (L-2.3), Formula (L-2.4) and Formula (L-2.6).

[Chem. 17]

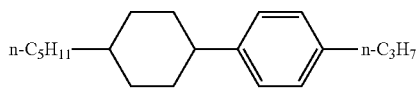
(L-2.1)

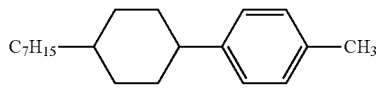
(L-2.2)

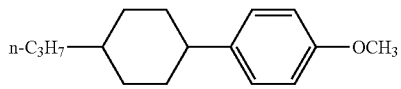
(L-2.3)

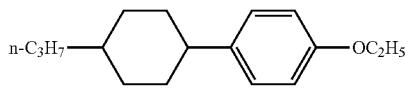
(L-2.4)

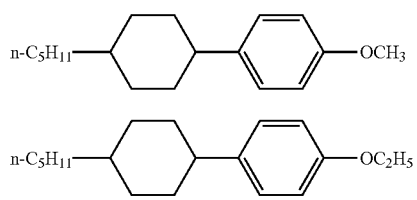

(L-2.5)

(L-2.6)

Further, the compound represented by General Formula (L) is preferably a compound selected from the compound group represented by General Formula (L-3).

[Chem. 18]

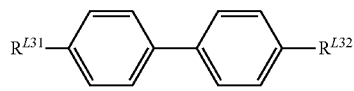

(L-3)

(In the formula, $R^{L31}$ and $R^{L32}$ each independently represent an alkyl group having 1 to 5 carbon atoms, an alkenyl group having 4 to 5 carbon atoms, or an alkoxy group having 1 to 4 carbon atoms.)

A type of the compound which can be combined is not particularly limited, and the compound is combined according to the required performances such as solubility at low temperature, transition temperature, electrical reliability, and birefringence. The number of the type of the compound to be used is, for example, 1 or 2 for one embodiment of the present invention.

In the composition of the present invention, it is necessary that the content of the compound represented by General Formula (L-3) is appropriately adjusted according to the required performances such as solubility at low temperature, transition temperature, electrical reliability, birefringence, process adaptability, drip marks, burn-in, and dielectric anisotropy.

A lower limit of a preferable content of the compound represented by Formula (L-2) with respect to a total amount of the composition of the present invention is 1%, 2%, 3%, 5%, 7%, or 10%. An upper limit of the preferable content with respect to a total amount of the composition of the present invention is 20%, 15%, 13%, 10%, 8%, 7%, 6%, 5%, or 3%.

In a case of obtaining high birefringence, it is highly effective to set the content to a great amount, and in contrast, in a case of putting importance on high Tni, it is highly effective to set the content to a small amount. Further, in a case of improving drip marks or burn-in properties, it is preferable to set the content in an intermediate range.

Further, the compound represented by General Formula (L-3) is preferably a compound selected from the compound group represented by Formula (L-3.1) to Formula (L-3.4), and preferably one of the compounds represented by Formula (L-3.2) to Formula (L-3.4).

[Chem. 19]

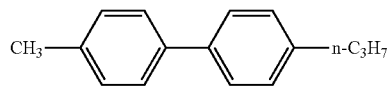

(L-3.1)

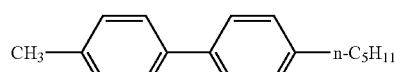

(L-3.2)

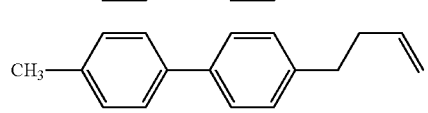

(L-3.3)

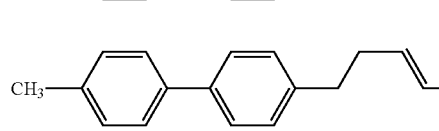

(L-3.4)

Further, the compound represented by General Formula (L) is preferably, for example, a compound selected from the compound group represented by General Formula (L-4).

[Chem. 20]

(L-4)

($R^{L41}$ represents an alkyl group having 1 to 5 carbon atoms, or an alkenyl group having 2 to 5 carbon atoms, $R^{L42}$ represents an alkyl group having 1 to 5 carbon atoms, an alkenyl group having 4 to 5 carbon atoms, or an alkoxy group having 1 to 4 carbon atoms.)

A type of the compound which can be combined is not particularly limited, and the compound is combined according to the required performances such as solubility at low temperature, transition temperature, electrical reliability, and birefringence. The number of the type of the compound to be used is, for example, 1 or 2 or more for one embodiment of the present invention.

In the composition of the present invention, it is necessary that the content of the compound represented by General Formula (L-4) is appropriately adjusted according to the required performances such as solubility at low temperature, transition temperature, electrical reliability, birefringence, process adaptability, drip marks, burn-in, and dielectric anisotropy.

A lower limit of a preferable content of the compound represented by Formula (L-4) with respect to a total amount of the composition of the present invention is 1%, 2%, 3%, 5%, 7%, 10%, 14%, 16%, 20%, 23%, 26%, 30%, 35%, or 40%. An upper limit of the preferable content of the compound represented by Formula (L-4) with respect to a total amount of the composition of the present invention is 50%, 40%, 35%, 30%, 20%, 15%, 10%, or 5%.

Further, the compound represented by General Formula (L-4) is preferably, for example, one of the compounds represented by Formula (L-4.1) to Formula (L-4.3).

[Chem. 21]

(L-4.1)

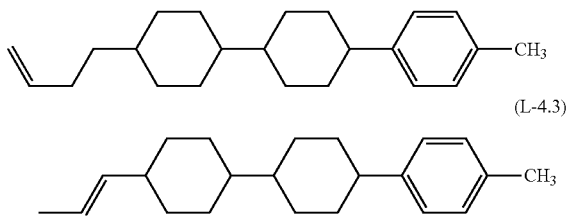

(L-4.2)

(L-4.3)

Depending on the required performances such as solubility at low temperature, transition temperature, electrical reliability, and birefringence, the compound represented by Formula (L-4.1) may be included, the compound represented by Formula (L-4.2) may be included, both the compound represented by Formula (L-4.1) and the compound represented by Formula (L-4.2) may be included, and all of the compounds represented by Formula (L-4.1) to Formula (L-4.3) may be included. A lower limit of a preferable content of the compound represented by Formula (L-4.1) or Formula (L-4.2) with respect to a total amount of the composition of the present invention is 3%, 5%, 7%, 9%, 11%, 12%, 13%, 18%, or 21%. A preferable upper limit is 45, 40%, 35%, 30%, 25%, 23%, 20%, 18%, 15%, or 13%.

In a case of both the compound represented by Formula (L-4.1) and the compound represented by Formula (L-4.2) are included, a lower limit of a preferable content of both the compounds with respect to a total amount of the composition of the present invention is 15%, 19%, 24%, or 30%. A preferable upper limit is 45, 40%, 35%, 30%, 25%, 23%, 20%, 18%, 15%, or 13%.

Further, the compound represented by General Formula (L-4) is preferably, for example, one of the compounds represented by Formula (L-4.4) to Formula (L-4.6).

[Chem. 22]

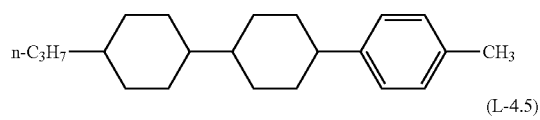

(L-4.4)

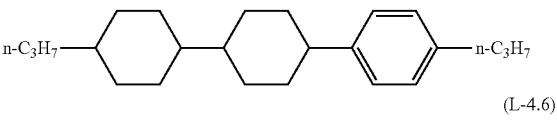

(L-4.5)

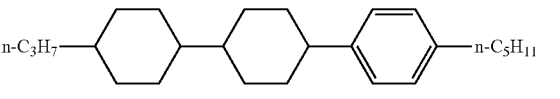

(L-4.6)

Depending on the required performances such as solubility at low temperature, transition temperature, electrical reliability, and birefringence, the compound represented by Formula (L-4.4) may be included, the compound represented by Formula (L-4.5) may be included, and both the compound represented by Formula (L-4.4) and the compound represented by Formula (L-4.5) may be included.

A lower limit of a preferable content of the compound represented by Formula (L-4.4) or Formula (L-4.5) with respect to a total amount of the composition of the present invention is 3%, 5%, 7%, 9%, 11%, 12%, 13%, 18%, or 21%. A preferable upper limit is 45, 40%, 35%, 30%, 25%, 23%, 20%, 18%, 15%, or 13%.

Further, the compound represented by General Formula (L-4) is preferably, for example, one of the compounds represented by Formula (L-4.7) to Formula (L-4.10), and particularly preferably a compound represented by Formula (L-4.9).

[Chem. 23]

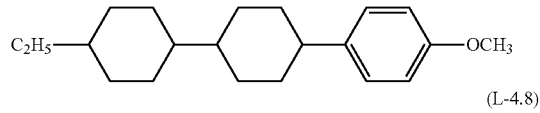

(L-4.7)

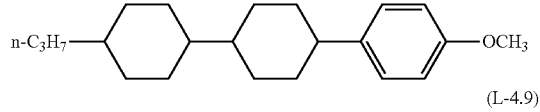

(L-4.8)

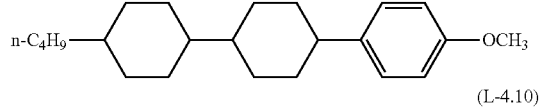

(L-4.9)

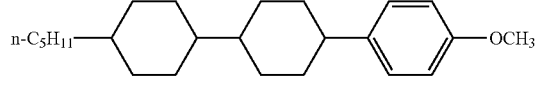

(L-4.10)

Further, the compound represented by General Formula (L) is preferably a compound selected from the compound group represented by General Formula (L-5).

[Chem. 24]

(L-5)

($R^{L51}$ represents an alkyl group having 1 to 5 carbon atoms, or an alkenyl group having 2 to 5 carbon atoms, and $R^{L52}$ represents an alkyl group having 1 to 5 carbon atoms, an alkenyl group having 4 to 5 carbon atoms, or an alkoxy group having 1 to 4 carbon atoms.)

A type of the compound which can be combined is not particularly limited, and the compound is combined according to the required performances such as solubility at low temperature, transition temperature, electrical reliability, and birefringence. The number of the type of the compound to be used is, for example, 1 or 2 or more for one embodiment of the present invention.

In the composition of the present invention, it is necessary that the content of the compound represented by General Formula (L-5) is appropriately adjusted according to the required performances such as solubility at low temperature, transition temperature, electrical reliability, birefringence, process adaptability, drip marks, burn-in, and dielectric anisotropy.

A lower limit of a preferable content of the compound represented by Formula (L-5) with respect to a total amount of the composition of the present invention is 1%, 2%, 3%, 5%, 7%, 10%, 14%, 16%, 20%, 23%, 26%, 30%, 35%, or 40%. An upper limit of the preferable content of the compound represented by Formula (L-5) with respect to a total amount of the composition of the present invention is 50%, 40%, 35%, 30%, 20%, 15%, 10%, or 5%.

Further, the compound represented by General Formula (L-5) is preferably, for example, a compound represented by Formula (L-5.1) or Formula (L-5.2), and particularly preferably a compound represented by Formula (L-5.1).

A lower limit of a preferable content of these compounds with respect to a total amount of the composition of the present invention is 1%, 2%, 3%, 5%, or 7%. An upper limit of the preferable content of these compounds is 20%, 15%, 13%, 10%, or 9%.

[Chem. 25]

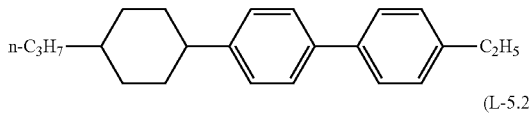

(L-5.1)

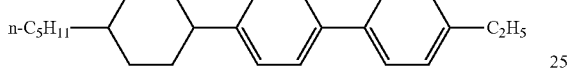

(L-5.2)

Further, the compound represented by General Formula (L-5) is preferably, for example, a compound represented by Formula (L-5.3) or Formula (L-5.4).

A lower limit of a preferable content of these compounds with respect to a total amount of the composition of the present invention is 1%, 2%, 3%, 5%, or 7%. An upper limit of the preferable content of these compounds is 20%, 15%, 13%, 10%, or 9%.

[Chem. 26]

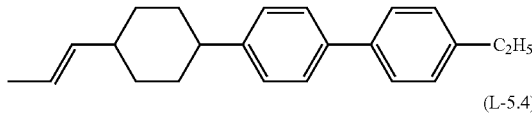

(L-5.3)

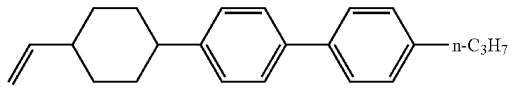

(L-5.4)

Further, the compound represented by General Formula (L-5) is preferably, for example, a compound selected from the compound group represented by Formula (L-5.5) to Formula (L-5.7), and particularly preferably a compound represented by Formula (L-5.7)

A lower limit of a preferable content of these compounds with respect to a total amount of the composition of the present invention is 1%, 2%, 3%, 5%, or 7%. An upper limit of the preferable content of these compounds is 20%, 15%, 13%, 10%, or 9%.

[Chem. 27]

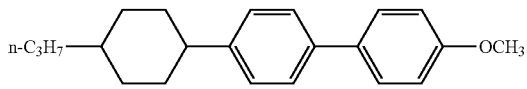

(L-5.5)

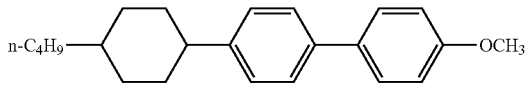

(L-5.6)

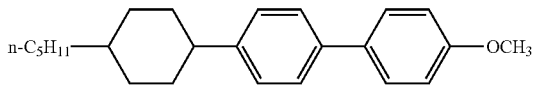

(L-5.7)

Further, the compound represented by General Formula (L) is preferably a compound selected from the group represented by General Formula (L-6).

[Chem. 28]

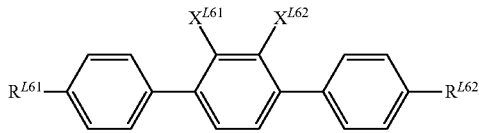

(L-6)

(In the formula, $R^{L61}$ and $R^{L62}$ each independently represent an alkyl group having 1 to 5 carbon atoms or an alkenyl group having 2 to 5 carbon atoms, and $X^{L61}$ and $X^{L62}$ each independently represent a hydrogen atom or a fluorine atom.)

A type of the compound which can be combined is not particularly limited, and the compound is combined according to the required performances such as solubility at low temperature, transition temperature, electrical reliability, and birefringence. The number of the type of the compound to be used is, for example, 1 or 2 or more for one embodiment of the present invention.

In the composition of the present invention, it is necessary that the content of the compound represented by General Formula (L-6) is appropriately adjusted according to the required performances such as solubility at low temperature, transition temperature, electrical reliability, birefringence, process adaptability, drip marks, burn-in, and dielectric anisotropy.

A lower limit of a preferable content of the compound represented by Formula (L-6) with respect to a total amount of the composition of the present invention is 1%, 2%, 3%, 5%, 7%, 10%, 14%, 16%, 20%, 23%, 26%, 30%, 35%, or 40%. An upper limit of the preferable content of the compound represented by Formula (L-6) with respect to a total amount of the composition of the present invention is 50%, 40%, 35%, 30%, 20%, 15%, 10%, or 5%.

Further, the compound represented by General Formula (L-6) is preferably, for example, one of the compounds represented by Formula (L-6.1) to Formula (L-6.9).

[Chem. 29]

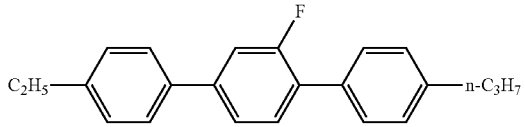

(L-6.1)

-continued

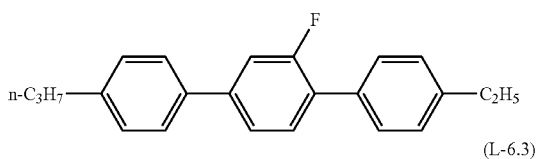
(L-6.2)

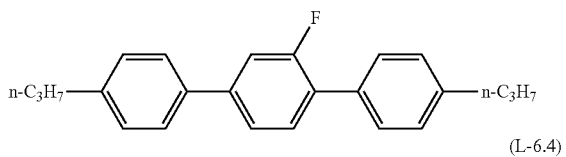
(L-6.3)

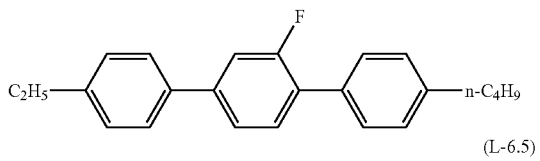
(L-6.4)

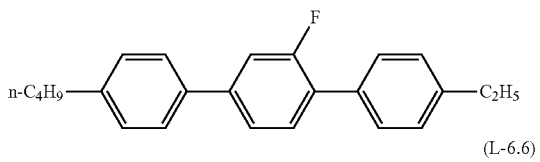
(L-6.5)

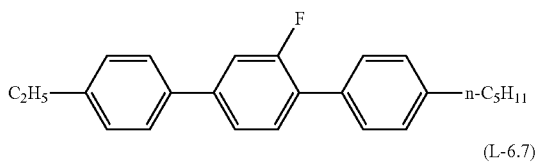
(L-6.6)

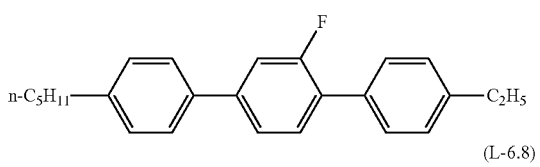
(L-6.7)

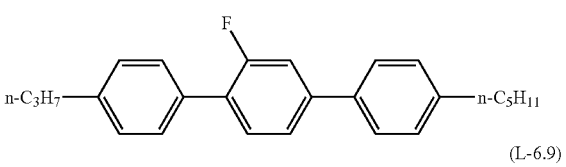
(L-6.8)

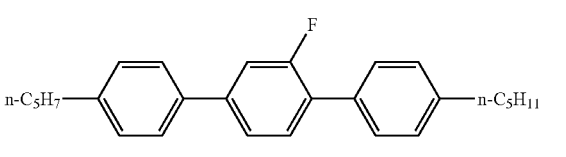
(L-6.9)

A type of the compound which can be combined is not particularly limited, and 1 to 3 types from the compounds are preferably contained, and 1 to 4 types thereof are more preferably contained. In addition, since a wide molecular weight distribution of the compound to be selected is effective for solubility, for example, it is preferable to select 1 type from the compound represented by Formula (L-6.1) or (L-6.2), 1 type from the compound represented by Formula (L-6.4) or (L-6.5), 1 type from the compound represented by Formula (L-6.6) or (L-6.7), and 1 type from the compound represented by Formula (L-6.8) or (L-6.9), and appropriately combine the selected compounds. Among the above, it is preferable to contain the compounds represented by Formula (L-6.1), Formula (L-6.3), Formula (L-6.4), Formula (L-6.6) and Formula (L-6.9).

Further, the compound represented by General Formula (L-6) is preferably, for example, one of the compounds represented by Formula (L-6.10) to Formula (L-6.17), and among the above, is preferably a compound represented by Formula (L-6.11).

[Chem. 30]

(L-6.10)

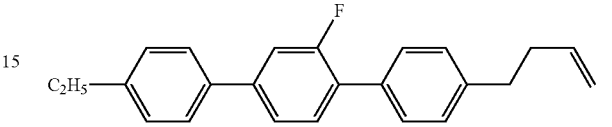
(L-6.11)

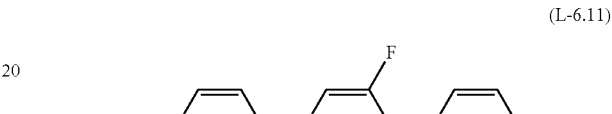
(L-6.12)

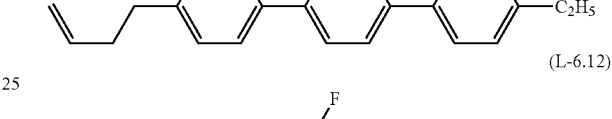
(L-6.13)

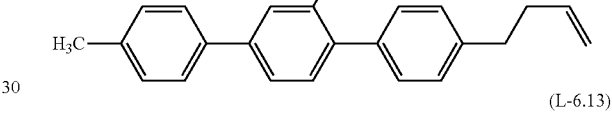
(L-6.14)

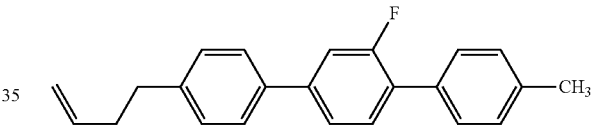
(L-6.15)

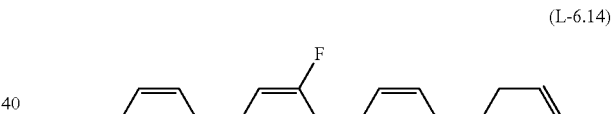
(L-6.16)

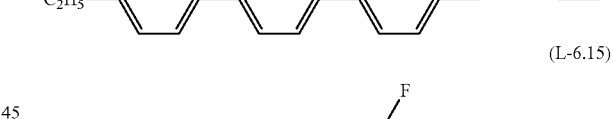
(L-6.17)

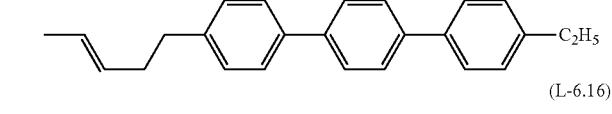

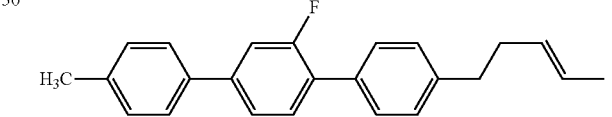

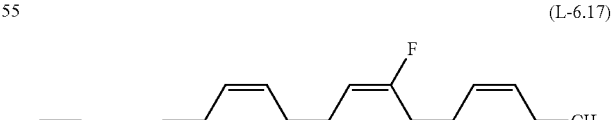

A lower limit of a preferable content of these compounds with respect to a total amount of the composition of the present invention is 1%, 2%, 3%, 5%, or 7%. An upper limit of the preferable content of these compounds is 20%, 15%, 13%, 10%, or 9%.

Further, the compound represented by General Formula (L) is preferably a compound selected from the group represented by General Formula (L-7).

[Chem. 31]

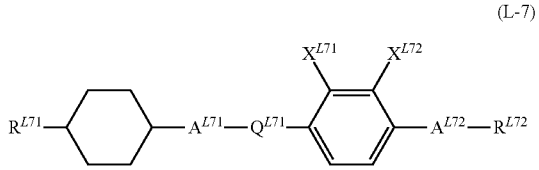

(L-7)

(In the formula, $R^{L71}$ and $R^{L72}$ each independently represent an alkyl group having 1 to 5 carbon atoms, an alkenyl group having 2 to 5 carbon atoms, or an alkoxy group having 1 to 4 carbon atoms, $A^{L71}$ and $A^{L72}$ each independently represent a 1,4-cyclohexylene group or a 1,4-phenylene group, hydrogen atoms on $A^{L71}$ and $A^{L72}$ each independently may be substituted with a fluorine atom, $Q^{L71}$ represents a single bond or COO—, and $X^{L71}$ and $X^{L72}$ each independently represent a fluorine atom or a hydrogen atom.)

A type of the compound which can be combined is not particularly limited, the compound is combined according to the required performances such as solubility at low temperature, transition temperature, electrical reliability, and birefringence. The number of the type of the compound to be used is, for example, 1, 2, 3, or 4 for one embodiment of the present invention.

In the composition of the present invention, it is necessary that the content of the compound represented by General Formula (L-7) is appropriately adjusted according to the required performances such as solubility at low temperature, transition temperature, electrical reliability, birefringence, process adaptability, drip marks, burn-in, and dielectric anisotropy.

A lower limit of a preferable content of the compound represented by Formula (L-7) with respect to a total amount of the composition of the present invention is 1%, 2%, 3%, 5%, 7%, 10%, 14%, 16%, or 20%. An upper limit of the preferable content of the compound represented by Formula (L-7) with respect to a total amount of the composition of the present invention is 30%, 25%, 23%, 20%, 18%, 15%, 10%, or 5%.

In a case where an embodiment in which the composition of the present invention has high Tni is desired, it is preferable to increase the content of the compound represented by Formula (L-7), and in a case where an embodiment in which the composition has low viscosity is desired, it is preferable to decrease the content.

Further, the compound represented by General Formula (L-7) is preferably one of the compounds represented by Formula (L-7.1) to Formula (L-7.4), and preferably a compound represented by Formula (L-7.2).

[Chem. 32]

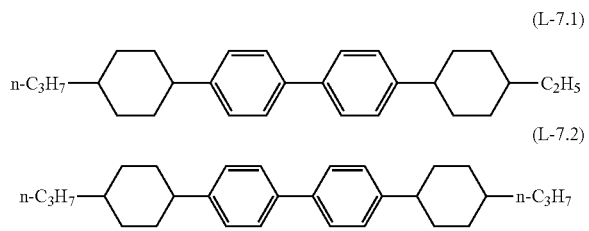

(L-7.1)

(L-7.2)

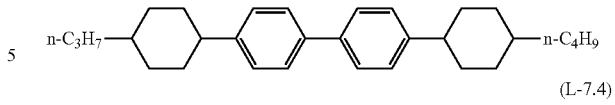

(L-7.3)

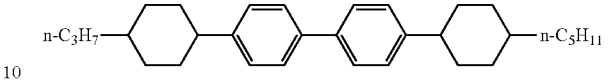

(L-7.4)

Further, the compound represented by General Formula (L-7) is preferably one of the compounds represented by Formula (L-7.11) to Formula (L-7.13), and preferably a compound represented by Formula (L-7.11).

[Chem. 33]

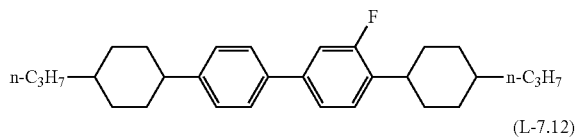

(L-7.11)

(L-7.12)

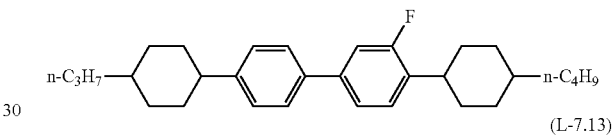

(L-7.13)

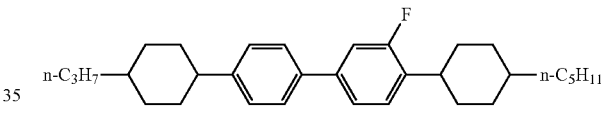

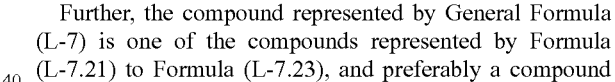

Further, the compound represented by General Formula (L-7) is one of the compounds represented by Formula (L-7.21) to Formula (L-7.23), and preferably a compound represented by Formula (L-7.21).

[Chem. 34]

(L-7.21)

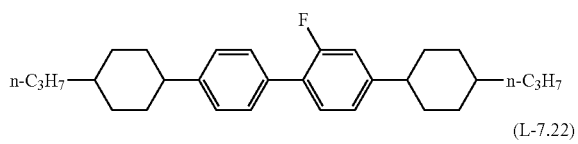

(L-7.22)

(L-7.23)

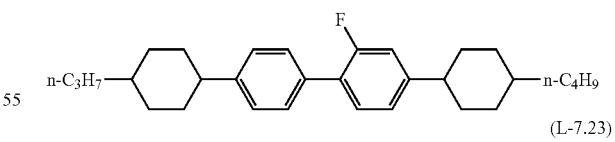

Further, the compound represented by General Formula (L-7) is preferably one of the compounds represented by Formula (L-7.31) to Formula (L-7.34), and preferably a compound represented by Formula (L-7.31) and/or Formula (L-7.32).

[Chem. 35]

(L-7.31)
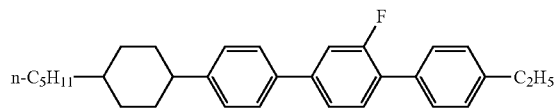

(L-7.32)
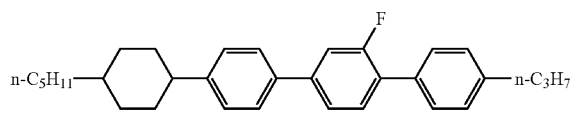

(L-7.33)
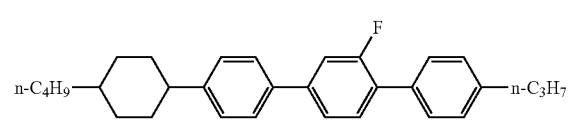

(L-7.34)
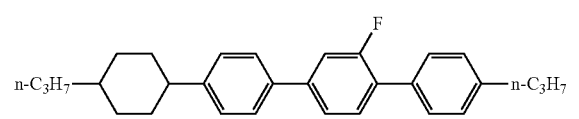

Further, the compound represented by General Formula (L-7) is preferably one of the compounds represented by Formula (L-7.41) to Formula (L-7.44), and preferably a compound represented by Formula (L-7.41) and/or Formula (L-7.42).

[Chem. 36]

(L-7.41)
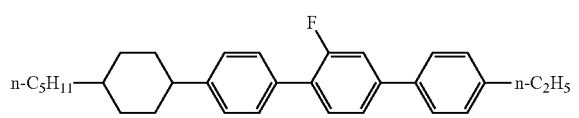

(L-7.42)
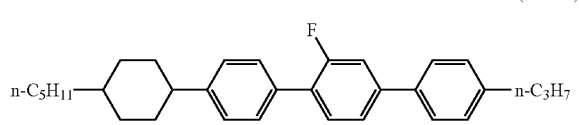

(L-7.43)
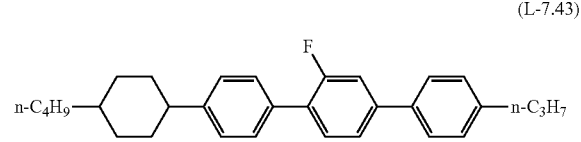

(L-7.44)
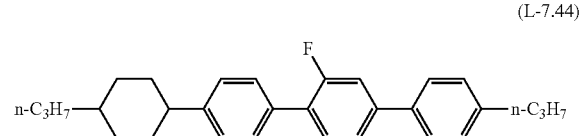

The composition of the present invention preferably contains the compound represented by General Formula (M).

[Chem. 37]

(M)
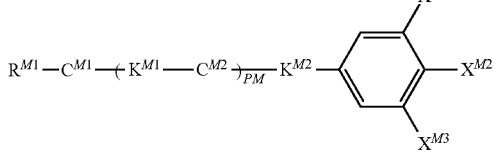

(In the formula, $R^{M1}$ represents an alkyl group having 1 to 8 carbon atoms, one —$CH_2$— or two or more non-adjacent —$CH_2$—'s in the alkyl group each independently may be substituted with —CH=CH—, —C≡C—, —O—, —CO—, —COO—, or —OCO—, PM represents 0, 1, 2, 3, or 4, $C^{M1}$ and $C^{M2}$ each independently represent a group selected from the group consisting of (d) a 1,4-cyclohexylene group (one —$CH_2$— or two or more non-adjacent —$CH_2$—'s existing in this group may be substituted with —O— or —S—) and (e) a 1,4-phenylene group (one —CH= or two or more non-adjacent —CH='s existing in this group may be substituted with —N=), hydrogen atoms on the group (d) and group (e) each independently may be substituted with a cyano group, a fluorine atom, or a chlorine atom, $K^{M1}$ and $K^{M2}$ each independently represent a single bond, —$CH_2CH_2$—, —$(CH_2)_4$—, —$OCH_2$—, —$CH_2O$—, —$OCF_2$—, —$CF_2O$—, —COO—, —OCO—, or —C≡C—, when PM is 2, 3, or 4 and a plurality of $K^{M1}$'s exist, the plurality of $K^{M1}$'s may be the same as or different from each other, when PM is 2, 3, or 4 and a plurality of $C^{M2}$'s exist, the plurality of $C^{M2}$'s may be the same as or different from each other, $X^{M1}$ and $X^{M3}$ each independently represent a hydrogen atom, a chlorine atom, or a fluorine atom, $X^{M2}$ represents a hydrogen atom, a fluorine atom, a chlorine atom, a cyano group, a trifluoromethyl group, a fluoromethoxy group, a difluoromethoxy group, a trifluoromethoxy group, or a 2,2,2-trifluoroethyl group. Here, the compound represented by General Formula (i), the compound represented by General Formula (M-1), and the compound represented by General Formula (M-4) are excluded.)

A type of the compound which can be combined is not particularly limited, and the compound is combined according to desired performances such as solubility at low temperature, transition temperature, electrical reliability, and birefringence, and used. The number of the type of the compound to be used is, for example, 1, 2, or 3 for one embodiment of the present invention. Further, in another embodiment of the present invention, the number of the type of the compound to be used is 4, 5, 6, or 7 or more.

In the composition of the present invention, it is necessary that the content of the compound represented by General Formula (M) is appropriately adjusted according to the required performances such as solubility at low temperature, transition temperature, electrical reliability, birefringence, process adaptability, drip marks, burn-in, and dielectric anisotropy.

A lower limit of a preferable content of the compound represented by Formula (M) with respect to a total amount of the composition of the present invention is 1%, 10%, 20%, 30%, 40%, 50%, 55%, 60%, 65%, 70%, 75%, or 80%. An upper limit of the preferable content with respect to a total amount of the composition of the present invention is, for example, 95%, 85%, 75%, 65%, 55%, 45%, 35%, or 25% in one embodiment of the present invention.

In a case where a composition having a high response speed is needed, while maintaining low viscosity of the composition of the present invention, the lower limit is preferably low, and the upper limit is preferably low. Further, in a case where a composition having excellent temperature stability is needed, while maintaining high Tni of the composition of the present invention, the lower limit is preferably low, and the upper limit is preferably low. In addition, in a case where dielectric anisotropy is needed to be increased in order to maintain low driving voltage, the lower limit is preferably high, and the upper limit is preferably high.

In a case of putting importance on reliability, $R^{M1}$ is preferably an alkyl group, and in a case of putting importance on lowering of viscosity, $R^{M1}$ is preferably an alkenyl group.

In a case where a ring structure to which $R^{M1}$ is bonded is a phenyl group (aromatic group), $R^{M1}$ is preferably a linear alkyl group having 1 to 5 carbon atoms, a linear alkoxy group having 1 to 4 carbon atoms, and an alkenyl group having 4 to 5 carbon atoms, and in a case where a ring structure to which $R^{M1}$ is bonded is a saturated ring structure such as cyclohexane, pyran, and dioxane, $R^{M1}$ is preferably a linear alkyl group having 1 to 5 carbon atoms, a linear alkoxy group having 1 to 4 carbon atoms, and a linear alkenyl group having 2 to 5 carbon atoms.

In a case where chemical stability of the composition is required, the compound represented by General Formula (M) preferably does not contain a chlorine atom in its molecule. Further, 5% or less is preferable as the content of the compound having a chlorine atom in the composition, 3% or less is preferable, 1% or less is preferable, 0.5% or less is preferable, and the composition preferably does not contain the compound substantially. The composition substantially not containing the compound means that the composition only contains the compound unintentionally having a chlorine atom, which is produced as impurities during manufacturing of the compound.

Further, the compound represented by General Formula (M) is, for example, a compound selected from the compound group represented by General Formula (M-2).

[Chem. 38]

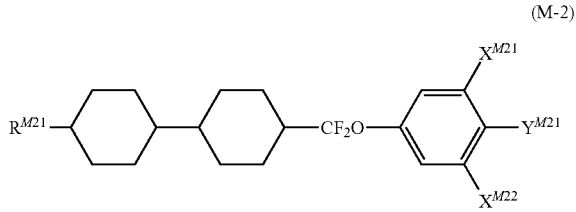

(M-2)

(In the formula, $R^{M21}$ represents an alkyl group having 1 to 5 carbon atoms, an alkenyl group having 2 to 5 carbon atoms, or an alkoxy group having 1 to 4 carbon atoms, $X^{M21}$ and $X^{M22}$ each independently represent a hydrogen atom or a fluorine atom, and $Y^{M21}$ represents a fluorine atom, a chlorine atom, or $OCF_3$.)

A lower limit of a preferable content of the compound represented by Formula (M-1) with respect to a total amount of the composition of the present invention is 1%, 2%, 5%, 8%, 10%, 13%, 15%, 18%, 20%, 22%, 25%, or 30%. An upper limit of the preferable content is 30%, 28%, 25%, 23%, 20%, 18%, 15%, 13%, 10%, 8%, or 5%.

In a case where a composition having a high response speed is needed, while maintaining low viscosity of the composition of the present invention, the lower limit is preferably low, and the upper limit is preferably low. Further, in a case where a composition in which burn-in hardly occurs is needed, while maintaining high Tni of the composition of the present invention, the lower limit is preferably low, and the upper limit is preferably low. In addition, in a case where dielectric anisotropy is needed to be increased in order to maintain low driving voltage, the lower limit is preferably high, and the upper limit is preferably high.

Further, the compound represented by General Formula (M-2) is preferably one of the compounds represented by Formula (M-2.1) to Formula (M-2.5), and preferably a compound represented by Formula (M-2.3) and/or Formula (M-2.5).

[Chem. 39]

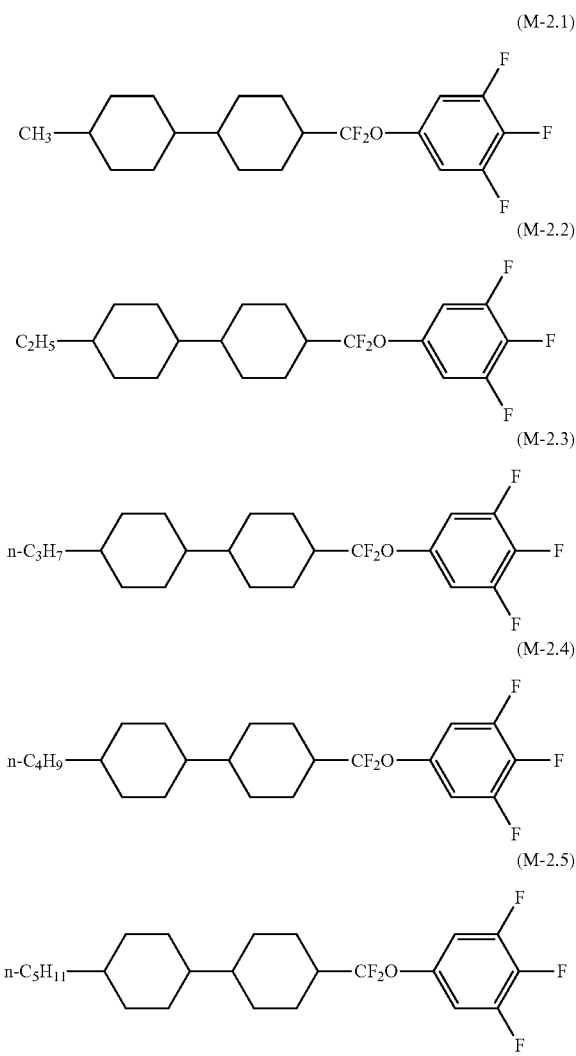

A lower limit of a preferable content of the compound represented by Formula (M-2.2) with respect to a total amount of the composition of the present invention is 1%, 2%, 5%, or 6%. An upper limit of the preferable content is 15%, 13%, 10%, 8%, or 5%.

A lower limit of a preferable content of the compound represented by Formula (M-2.3) with respect to a total amount of the composition of the present invention is 1%, 2%, 5%, or 6%. An upper limit of the preferable content is 30%, 25%, 23%, 20%, 18%, 15%, 13%, 10%, or 8%.

A lower limit of a preferable content of the compound represented by Formula (M-2.5) with respect to a total amount of the composition of the present invention is 1%, 2%, 5%, or 6%. An upper limit of the preferable content is 30%, 25%, 23%, 20%, 18%, 15%, 13%, 10%, or 8%.

A lower limit of a preferable total content of the compounds represented by Formulas (M-2.2), (M-2.3), and (M-2.5) with respect to a total amount of the composition of the present invention is 1%, 2%, 5%, or 6%. An upper limit of the preferable content is 30%, 25%, 23%, 20%, 18%, 15%, 13%, 10%, or 8%.

The content is preferably 1% or more, more preferably 5% or more, still more preferably 8% or more, still more preferably 10% or more, still more preferably 14% or more, and particularly preferably 16% or more with respect to a total amount of the composition of the present invention. In addition, a maximum ratio is preferably 30% or less, more preferably 25% or less, still more preferably 22% or less, and particularly preferably less than 20%, in consideration of solubility at low temperature, transition temperature, and electrical reliability.

The compound represented by General Formula (M) used in the composition of the present invention is preferably a compound represented by General Formula (M-3).

[Chem. 40]

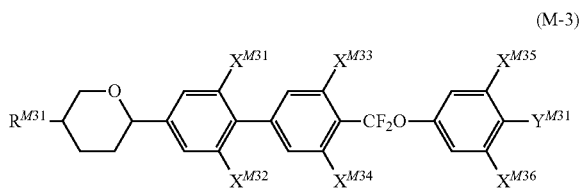

(M-3)

(In the formula, $R^{M31}$ represents an alkyl group having 1 to 5 carbon atoms, an alkenyl group having 2 to 5 carbon atoms, or an alkoxy group having 1 to 4 carbon atoms, $X^{M31}$ to $X^{M36}$ each independently represent a hydrogen atom, or a fluorine atom, and $Y^{M31}$ represents a fluorine atom, a chlorine atom, or $OCF_3$.)

A compound which can be combined is not particularly limited, and one or more type of the compound is preferably combined in consideration of solubility at low temperature, transition temperature, electrical reliability, and birefringence.

The content of the compound represented by General Formula (M-3) has an upper limit and a lower limit for each embodiment, in consideration of properties such as solubility at low temperature, transition temperature, electrical reliability, and birefringence.

A lower limit of a preferable content of the compound represented by Formula (M-3) with respect to a total amount of the composition of the present invention is 1%, 2%, 4%, 5%, 8%, 10%, 13%, 15%, 18%, or 20%. An upper limit of the preferable content is 20%, 18%, 15%, 13%, 10%, 8%, or 5%.

Further, the compound represented by General Formula (M-3) used in the composition of the present invention is preferably, specifically, one of the compounds represented by Formula (M-3.1) to Formula (M-3.4), and among the above, the compound represented by Formula (M-3.1) and/or Formula (M-3.2) is preferably contained.

[Chem. 41]

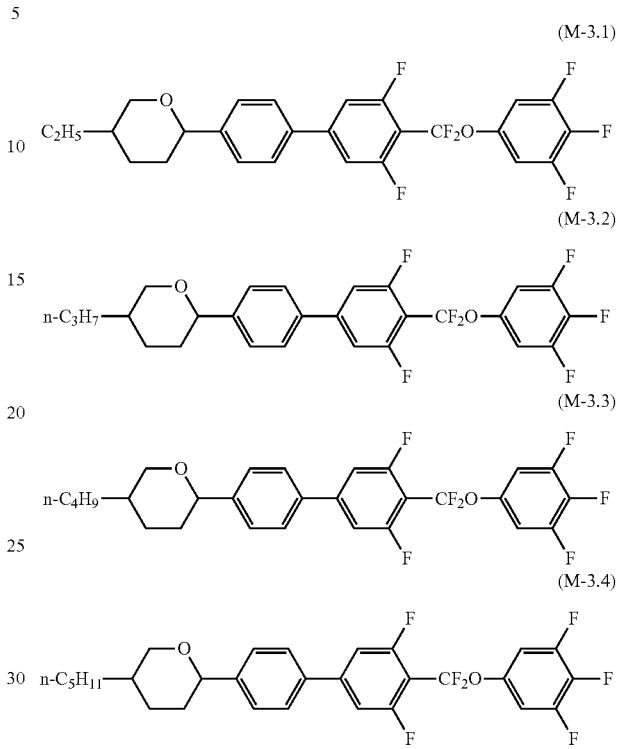

A lower limit of a preferable content of the compound represented by Formula (M-3.1) with respect to a total amount of the composition of the present invention is 1%, 2%, 4%, 5%, 8%, 10%, 13%, 15%, 18%, or 20%. An upper limit of the preferable content is 20%, 18%, 15%, 13%, 10%, 8%, or 5%.

A lower limit of a preferable content of the compound represented by Formula (M-3.2) with respect to a total amount of the composition of the present invention is 1%, 2%, 4%, 5%, 8%, 10%, 13%, 15%, 18%, or 20%. An upper limit of the preferable content is 20%, 18%, 15%, 13%, 10%, 8%, or 5%.

A lower limit of a preferable total content of the compounds represented by Formula (M-3.1) and Formula (M-3.2) with respect to a total amount of the composition of the present invention is 1%, 2%, 4%, 5%, 8%, 10%, 13%, 15%, 18%, or 20%. An upper limit of the preferable content is 20%, 18%, 15%, 13%, 10%, 8%, or 5%.

Further, the compound represented by General Formula (M) is preferably a compound represented by General Formula (M-5).

[Chem. 42]

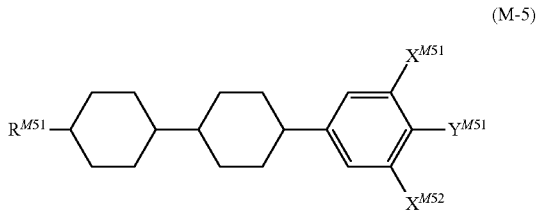

(M-5)

(In the formula, $R^{M51}$ represents an alkyl group having 1 to 5 carbon atoms, an alkenyl group having 2 to 5 carbon atoms, or an alkoxy group having 1 to 4 carbon atoms, $X^{M51}$ and $X^{M52}$ each independently represent a hydrogen atom or a fluorine atom, and $Y^{M51}$ represents a fluorine atom, a chlorine atom, or $OCF_3$.)

A type of the compound which can be combined is not limited, and the compound is appropriately combined for each embodiment, in consideration of solubility at low temperature, transition temperature, electrical reliability, and birefringence and used. For example, 1 type of the compound is combined in one embodiment of the present invention, 2 types are combined in another embodiment, 3 types are combined in yet another embodiment, 4 types are combined in yet another embodiment, 5 types are combined in yet another embodiment, and 6 or more types are combined in yet another embodiment.

A lower limit of a preferable content of the compound represented by Formula (M-5) with respect to a total amount of the composition of the present invention is 1%, 2%, 5%, 8%, 10%, 13%, 15%, 18%, 20%, 22%, 25%, or 30%. An upper limit of the preferable content is 50%, 45%, 40%, 35%, 33%, 30%, 28%, 25%, 23%, 20%, 18%, 15%, 13%, 10%, 8%, or 5%.

In a case where a composition having a high response speed is needed, while maintaining low viscosity of the composition of the present invention, the lower limit is preferably low, and the upper limit is preferably low. Further, in a case where a composition in which burn-in hardly occurs is needed, while maintaining high Tni of the composition of the present invention, the lower limit is preferably low, and the upper limit is preferably low. In addition, in a case where dielectric anisotropy is needed to be increased in order to maintain low driving voltage, the lower limit is preferably high, and the upper limit is preferably high.

Further, the compound represented by General Formula (M-5) is preferably one of the compounds represented by Formula (M-5.1) to Formula (M-5.4), and preferably one of the compounds represented by Formula (M-5.1) to Formula (M-5.4)

[Chem. 43]

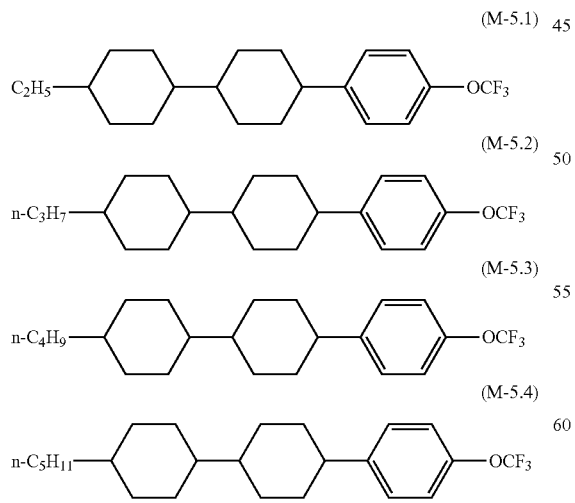

A lower limit of a preferable content of the compounds with respect to a total amount of the composition of the present invention is 1%, 2%, 5%, 8%, 10%, 13%, or 15%. An upper limit of the preferable content is 30%, 28%, 25%, 23%, 20%, 18%, 15%, 13%, 10%, 8%, or 5%.

Further, the compound represented by General Formula (M-5) is preferably one of the compounds represented by Formula (M-5.11) to Formula (M-5.17), and preferably one of the compounds represented by Formula (M-5.11), Formula (M-5.13), and Formula (M-5.17).

[Chem. 44]

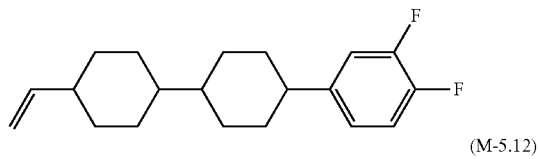

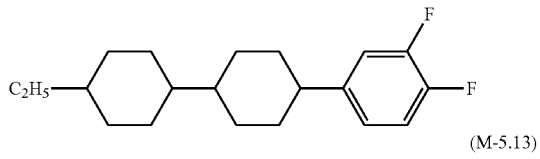

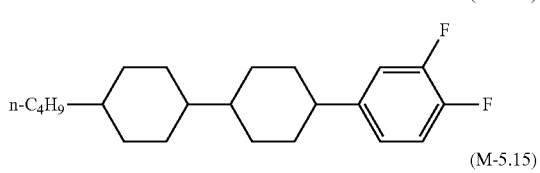

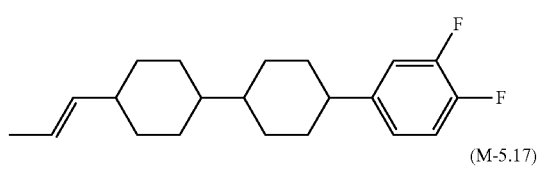

A lower limit of a preferable content of the compounds with respect to a total amount of the composition of the present invention is 1%, 2%, 5%, 8%, 10%, 13%, or 15%. An upper limit of the preferable content is 30%, 28%, 25%, 23%, 20%, 18%, 15%, 13%, 10%, 8%, or 5%.

Further, the compound represented by General Formula (M-5) is preferably one of the compounds represented by Formula (M-5.21) to Formula (M-5.28), and preferably one of the compounds represented by Formula (M-5.21), Formula (M-5.22), Formula (M-5.23), and Formula (M-5.25).

[Chem. 45]

(M-5.21)

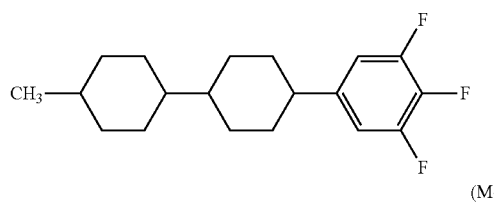
(M-5.22)

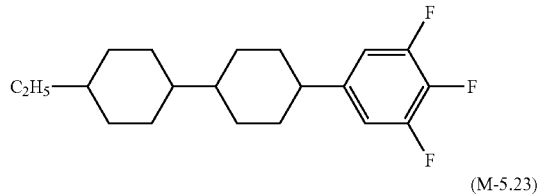
(M-5.23)

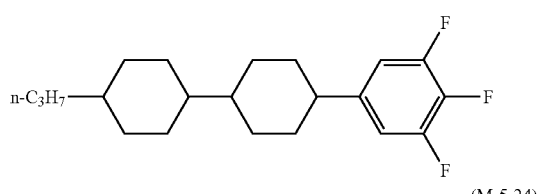
(M-5.24)

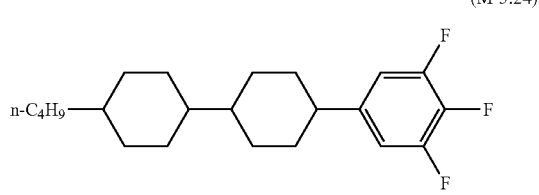
(M-5.25)

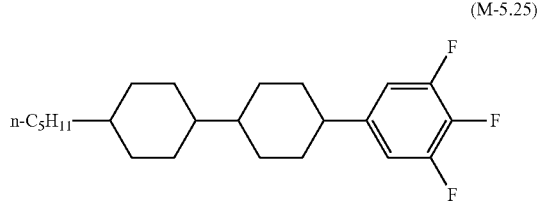
(M-5.26)

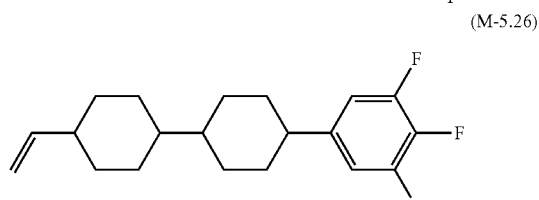
(M-5.27)

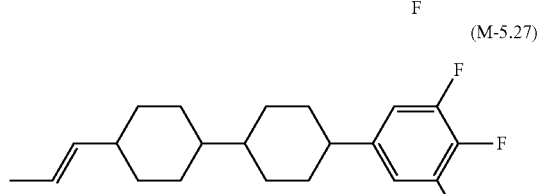
(M-5.28)

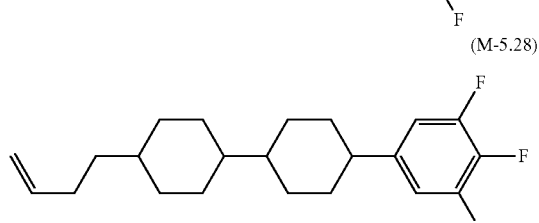

A lower limit of a preferable content of the compounds with respect to a total amount of the composition of the present invention is 1%, 2%, 5%, 8%, 10%, 13%, 15%, 18%, 20%, 22%, 25%, or 30%. An upper limit of the preferable content is 40%, 35%, 33%, 30%, 28%, 25%, 23%, 20%, 18%, 15%, 13%, 10%, 8%, or 5%.

Further, the compound represented by General Formula (M) is preferably a compound represented by General Formula (M-6).

[Chem. 46]

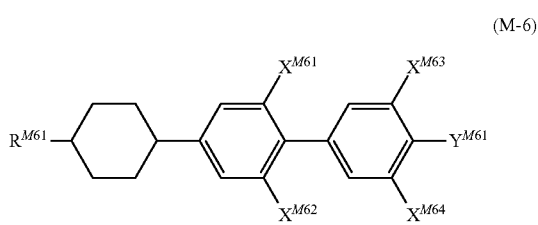
(M-6)

(In the formula, $R^{M61}$ represents an alkyl group having 1 to 5 carbon atoms, an alkenyl group having 2 to 5 carbon atoms, or an alkoxy group having 1 to 4 carbon atoms, $X^{M61}$ to $X^{M64}$ each independently represent a fluorine atom or a hydrogen atom, and $Y^{M61}$ represents a fluorine atom, a chlorine atom, or $OCF_3$. Here, the compound represented by General Formula (i) is excluded.)

A type of the compound which can be combined is not limited, and the compound is appropriately combined for each embodiment, in consideration of solubility at low temperature, transition temperature, electrical reliability, and birefringence.

A lower limit of a preferable content of the compound represented by Formula (M-6) with respect to a total amount of the composition of the present invention is 1%, 2%, 4%, 5%, 8%, 10%, 13%, 15%, 18%, or 20%. An upper limit of the preferable content is 30%, 28%, 25%, 23%, 20%, 18%, 15%, 13%, 10%, 8%, or 5%.

In a case where the composition of the present invention is used for a liquid crystal display element having low driving voltage, it is appropriate to increase the content of the compound represented by General Formula (M-6). In addition, in a case where the composition is used for a liquid crystal display element having a high response speed, it is appropriate to decrease the content of the compound represented by General Formula (M-6).

Further, the compound represented by General Formula (M-6) is preferably, specifically, one of the the compounds represented by Formula (M-6.1) to Formula (M-6.4), and among the above, the compounds represented by Formula (M-6.2) and Formula (M-6.4) are preferably contained.

[Chem. 47]

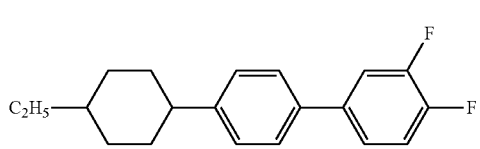
(M-6.1)

-continued (M-6.2)

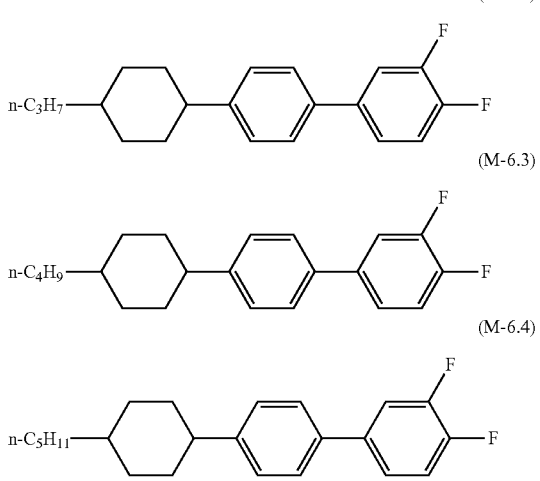

(M-6.3)

(M-6.4)

A lower limit of a preferable content of the compounds with respect to a total amount of the composition of the present invention is 1%, 2%, 4%, 5%, 8%, 10%, 13%, 15%, 18%, or 20%. An upper limit of the preferable content is 30%, 28%, 25%, 23%, 20%, 18%, 15%, 13%, 10%, 8%, or 5%.

Further, the compound represented by General Formula (M-6) is preferably, specifically, one of the compounds represented by Formula (M-6.11) to Formula (M-6.14), and among the above, the compounds represented by Formula (M-6.12) and Formula (M-6.14) are preferably contained.

[Chem. 48]

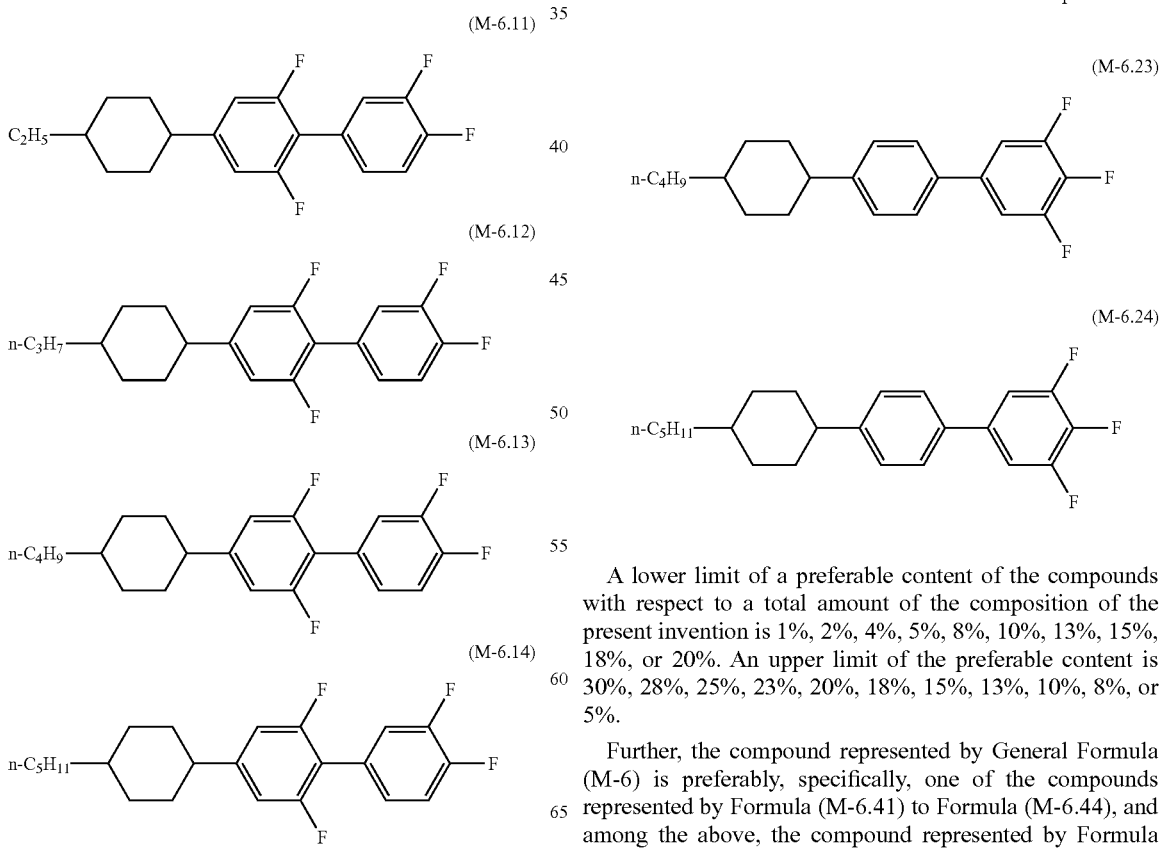

A lower limit of a preferable content of the compounds with respect to a total amount of the composition of the present invention is 1%, 2%, 4%, 5%, 8%, 10%, 13%, 15%, 18%, or 20%. An upper limit of the preferable content is 30%, 28%, 25%, 23%, 20%, 18%, 15%, 13%, 10%, 8%, or 5%.

Further, the compound represented by General Formula (M-6) is preferably, specifically, one of the compounds represented by Formula (M-6.21) to Formula (M-6.24), and among the above, the compounds represented by Formula (M-6.21), Formula (M-6.22), and Formula (M-6.24) are preferably contained.

[Chem. 49]

(M-6.21)

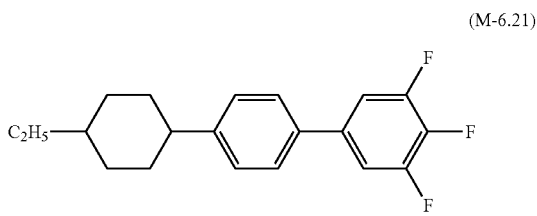

(M-6.22)

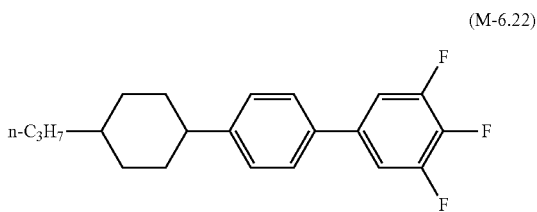

(M-6.23)

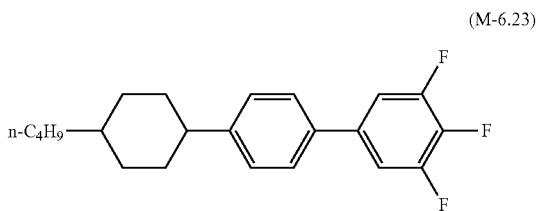

(M-6.24)

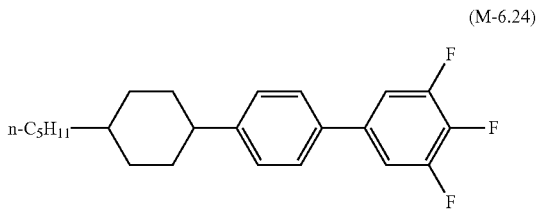

A lower limit of a preferable content of the compounds with respect to a total amount of the composition of the present invention is 1%, 2%, 4%, 5%, 8%, 10%, 13%, 15%, 18%, or 20%. An upper limit of the preferable content is 30%, 28%, 25%, 23%, 20%, 18%, 15%, 13%, 10%, 8%, or 5%.

Further, the compound represented by General Formula (M-6) is preferably, specifically, one of the compounds represented by Formula (M-6.41) to Formula (M-6.44), and among the above, the compound represented by Formula (M-6.42) is preferably contained.

[Chem. 50]

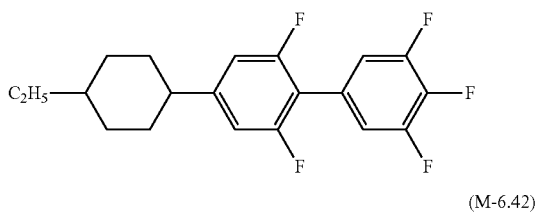
(M-6.41)

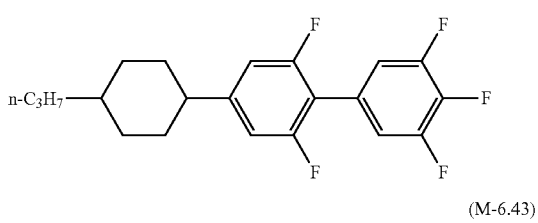
(M-6.42)

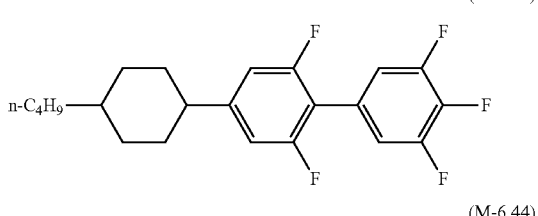
(M-6.43)

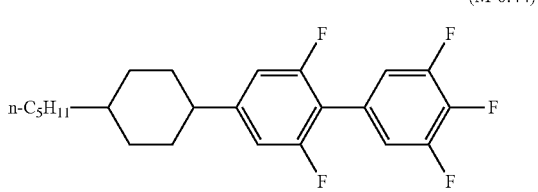
(M-6.44)

A lower limit of a preferable content of the compounds with respect to a total amount of the composition of the present invention is 1%, 2%, 4%, 5%, 8%, 10%, 13%, 15%, 18%, or 20%. An upper limit of the preferable content is 30%, 28%, 25%, 23%, 20%, 18%, 15%, 13%, 10%, 8%, or 5%.

Further, the compound represented by General Formula (M) is preferably a compound selected from the compound group represented by General Formula (M-7).

[Chem. 51]

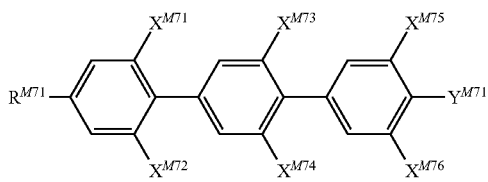
(M-7)

(In the formula, $X^{M71}$ to $X^{M76}$ each independently represent a fluorine atom or a hydrogen atom, $R^{M71}$ represents an alkyl group having 1 to 5 carbon atoms, an alkenyl group having 2 to 5 carbon atoms, or an alkoxy group having 1 to 4 carbon atoms, and $Y^{M71}$ represents a fluorine atom or $OCF_3$.)

A type of the compound which can be combined is not particularly limited, and among the compounds, 1 to 2 types of the compound are preferably contained, 1 to 3 types are more preferably contained, and 1 to 4 types are still more preferably contained.

The content of the compound represented by General Formula (M-7) has an upper limit and a lower limit for each embodiment, in consideration of properties such as solubility at low temperature, transition temperature, electrical reliability, and birefringence.

A lower limit of a preferable content of the compound represented by Formula (M-7) with respect to a total amount of the composition of the present invention is 1%, 2%, 4%, 5%, 8%, 10%, 13%, 15%, 18%, or 20%. An upper limit of the preferable content is 30%, 28%, 25%, 23%, 20%, 18%, 15%, 13%, 10%, 8%, or 5%.

In a case where the composition of the present invention is used for a liquid crystal display element having a small cell gap, it is appropriate to increase the content of the compound represented by General Formula (M-7). In a case where the composition is used for a liquid crystal display element having low driving voltage, it is appropriate to increase the content of the compound represented by General Formula (M-7). In addition, in a case where the composition is used for a liquid crystal display element used in a low temperature environment, it is appropriate to decrease the content of the compound represented by General Formula (M-7). In a case where the composition is used for a liquid crystal display element having a high response speed, it is appropriate to decrease the content of the compound represented by General Formula (M-7).

Further, the compound represented by General Formula (M-7) is preferably one of the compounds represented by Formula (M-7.1) to Formula (M-7.4), and preferably a compound represented by Formula (M-7.2).

[Chem. 52]

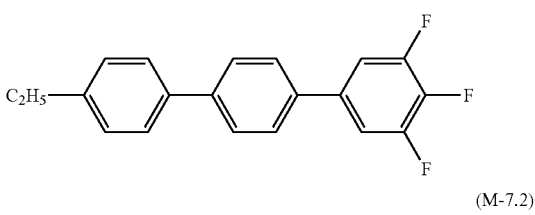
(M-7.1)

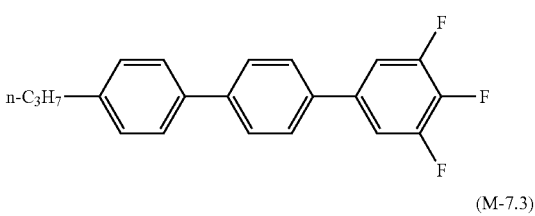
(M-7.2)

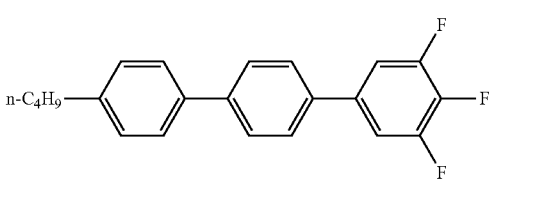
(M-7.3)

-continued (M-7.4)

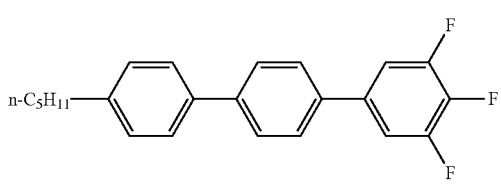

A lower limit of a preferable content of the compounds with respect to a total amount of the composition of the present invention is 1%, 2%, 4%, 5%, 8%, 10%, 13%, 15%, 18%, or 20%. An upper limit of the preferable content is 30%, 28%, 25%, 23%, 20%, 18%, 15%, 13%, 10%, 8%, or 5%.

Further, the compound represented by General Formula (M-7) is preferably one of the compounds represented by Formula (M-7.11) to Formula (M-7.14), and preferably one of the compounds represented by Formula (M-7.11) and Formula (M-7.12).

[Chem. 53]

(M-7.11)

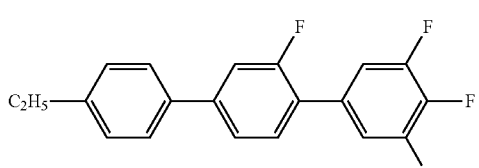

(M-7.12)

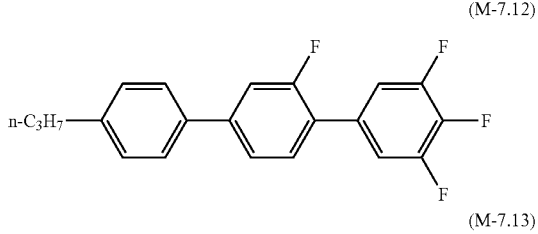

(M-7.13)

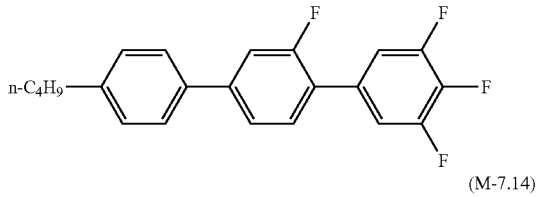

(M-7.14)

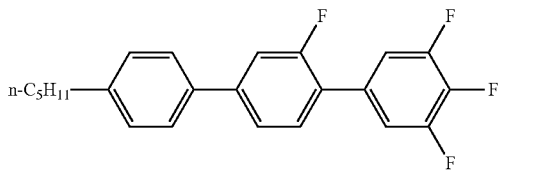

A lower limit of a preferable content of the compounds with respect to a total amount of the composition of the present invention is 1%, 2%, 4%, 5%, 8%, 10%, 13%, 15%, 18%, or 20%. An upper limit of the preferable content is 30%, 28%, 25%, 23%, 20%, 18%, 15%, 13%, 10%, 8%, or 5%.

Further, the compound represented by General Formula (M-7) is preferably one of the compounds represented by Formula (M-7.21) to Formula (M-7.24), and preferably one of the compounds represented by Formula (M-7.21) and Formula (M-7.22).

[Chem. 54]

(M-7.21)

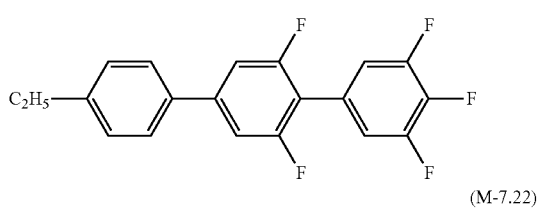

(M-7.22)

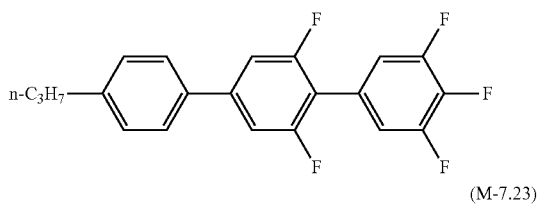

(M-7.23)

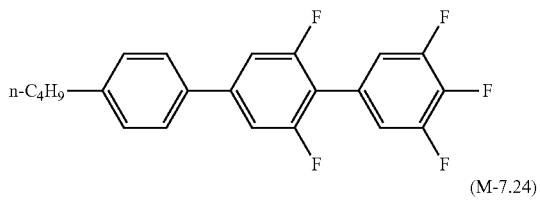

(M-7.24)

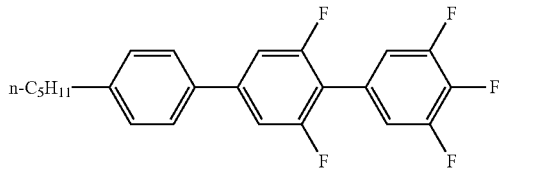

A lower limit of a preferable content of the compounds with respect to a total amount of the composition of the present invention is 1%, 2%, 4%, 5%, 8%, 10%, 13%, 15%, 18%, or 20%. An upper limit of the preferable content is 30%, 28%, 25%, 23%, 20%, 18%, 15%, 13%, 10%, 8%, or 5%.

Further, the compound represented by General Formula (M) is preferably a compound represented by General Formula (M-8).

[Chem. 55

(M-8)

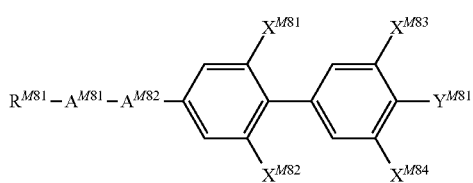

(In the formula, $X^{M81}$ to $X^{M84}$ each independently represent a fluorine atom or a hydrogen atom, $Y^{M81}$ represents a fluorine atom, a chlorine atom, or —$OCF_3$, $R^{M81}$ represents an alkyl group having 1 to 5 carbon atoms, an alkenyl group having 2 to 5 carbon atoms, or an alkoxy group having 1 to 4 carbon atoms, and $A^{M81}$ and $A^{M82}$ each independently represent a 1,4-cyclohexylene group, a 1,4-phenylene group, or

[Chem. 56]

[Chem. 57]

[Chem. 58]

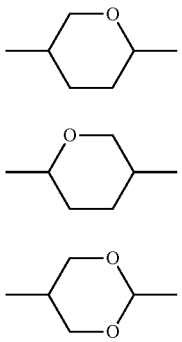

and a hydrogen atom on the 1,4-phenylene group may be substituted with a fluorine atom.)

A lower limit of a preferable content of the compound represented by General Formula (M-8) with respect to a total amount of the composition of the present invention is 1%, 2%, 4%, 5%, 8%, 10%, 13%, 15%, 18%, or 20%. An upper limit of the preferable content is 30%, 28%, 25%, 23%, 20%, 18%, 15%, 13%, 10%, 8%, or 5%.

In a case where a composition having a high response speed is needed, while maintaining low viscosity of the composition of the present invention, the lower limit is preferably low, and the upper limit is preferably low. Further, in a case where a composition in which burn-in hardly occurs is needed, the lower limit is preferably low, and the upper limit is preferably low. In addition, in a case where dielectric anisotropy is needed to be increased in order to maintain low driving voltage, the lower limit is preferably high, and the upper limit is preferably high.

Further, the compound represented by Formula (M-8) used in the composition of the present invention is preferably, specifically, one of the compounds represented by Formula (M-8.1) to Formula (M-8.4), and among the above, the compounds represented by Formula (M-8.1) and Formula (M-8.2) are preferably contained.

[Chem. 59]

(M-8.1)

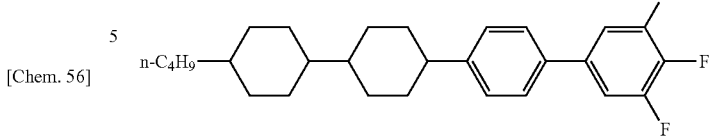

(M-8.2)

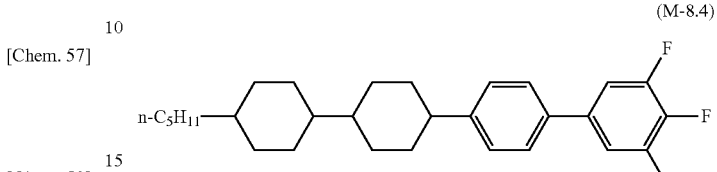

(M-8.3)

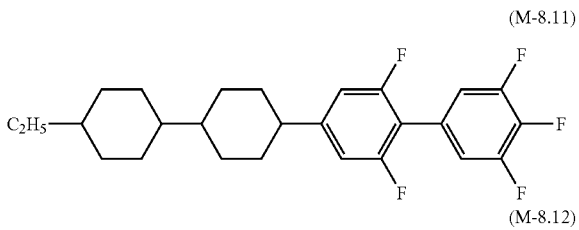

(M-8.4)

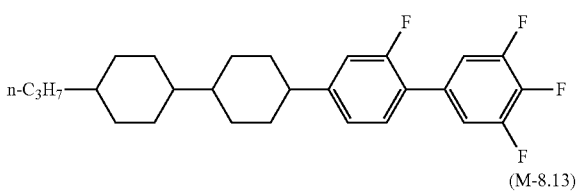

A lower limit of a preferable content of the compounds with respect to a total amount of the composition of the present invention is 1%, 2%, 4%, 5%, 8%, 10%, 13%, 15%, 18%, or 20%. An upper limit of the preferable content is 30%, 28%, 25%, 23%, 20%, 18%, 15%, 13%, 10%, 8%, or 5%.

Further, the compound represented by General Formula (M-8) used in the composition of the present invention is preferably, specifically, one of the compounds represented by Formula (M-8.11) to Formula (M-8.14), and among the above, the compound represented by Formula (M-8.12) is preferably contained.

[Chem. 60]

(M-8.11)

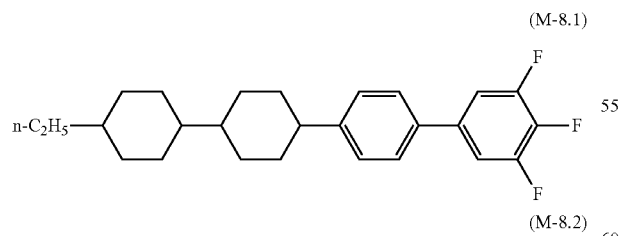

(M-8.12)

(M-8.13)

(M-8.14)

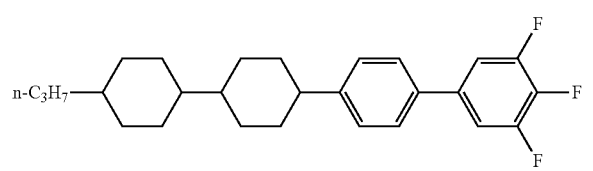

A lower limit of a preferable content of the compounds with respect to a total amount of the composition of the present invention is 1%, 2%, 4%, 5%, 8%, 10%, 13%, 15%, 18%, or 20%. An upper limit of the preferable content is 30%, 28%, 25%, 23%, 20%, 18%, 15%, 13%, 10%, 8%, or 5%.

Further, the compound represented by General Formula (M-8) used in the composition of the present invention is preferably, specifically, one of the compounds represented by Formula (M-8.21) to Formula (M-8.24), and among the above, the compound represented by Formula (M-8.22) is preferably contained.

[Chem. 61]

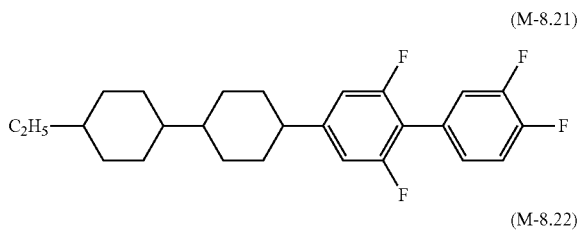
(M-8.21)

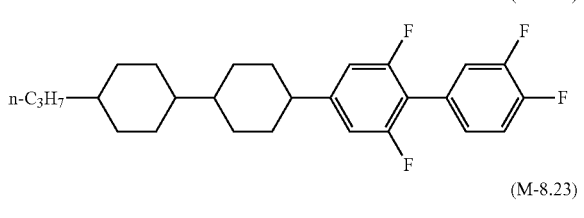
(M-8.22)

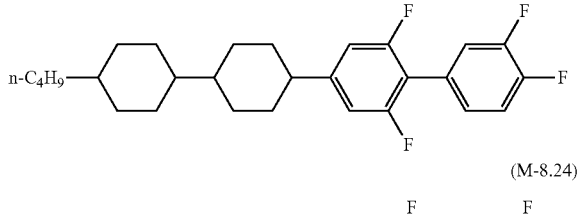
(M-8.23)

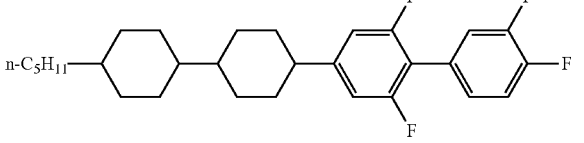
(M-8.24)

A lower limit of a preferable content of the compounds with respect to a total amount of the composition of the present invention is 1%, 2%, 4%, 5%, 8%, 10%, 13%, 15%, 18%, or 20%. An upper limit of the preferable content is 30%, 28%, 25%, 23%, 20%, 18%, 15%, 13%, 10%, 8%, or 5%.

Further, the compound represented by General Formula (M-8) used in the composition of the present invention is preferably, specifically, one of the compounds represented by Formula (M-8.31) to Formula (M-8.34), and among the above, the compound represented by Formula (M-8.32) is preferably contained.

[Chem. 62]

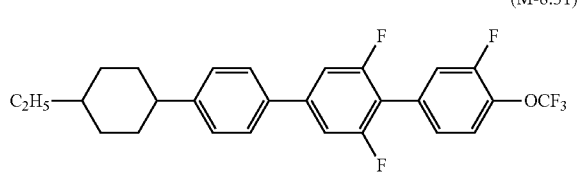
(M-8.31)

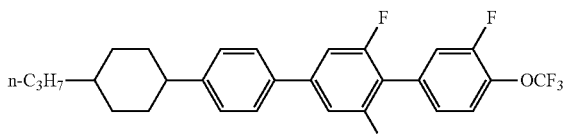
(M-8.32)

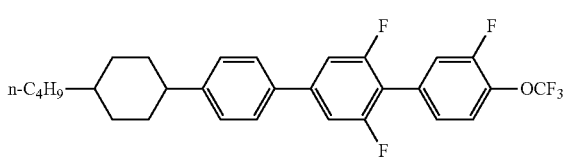
(M-8.33)

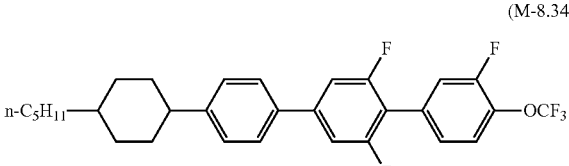
(M-8.34)

A lower limit of a preferable content of the compounds with respect to a total amount of the composition of the present invention is 1%, 2%, 4%, 5%, 8%, 10%, 13%, 15%, 18%, or 20%. An upper limit of the preferable content is 30%, 28%, 25%, 23%, 20%, 18%, 15%, 13%, 10%, 8%, or 5%.

Further, the compound represented by General Formula (M-8) used in the composition of the present invention is preferably, specifically, one of the compounds represented by Formula (M-8.41) to Formula (M-8.44), and among the above, the compound represented by Formula (M-8.42) is preferably contained.

[Chem. 63]

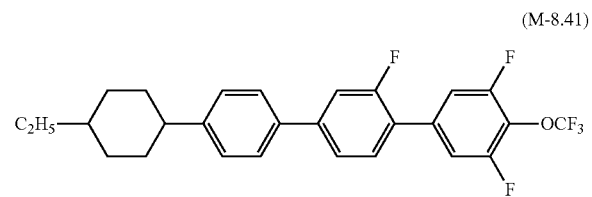
(M-8.41)

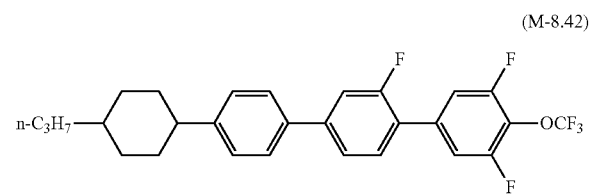
(M-8.42)

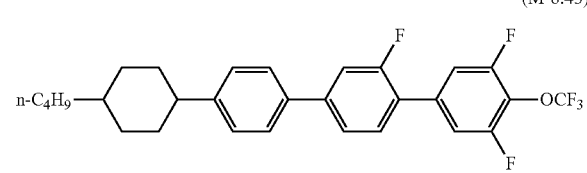
(M-8.43)

-continued (M-8.44)
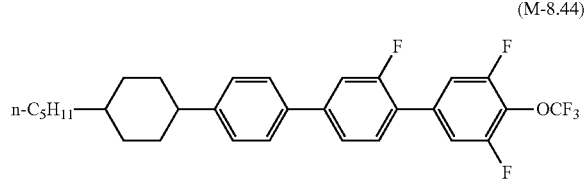

A lower limit of a preferable content of the compounds with respect to a total amount of the composition of the present invention is 1%, 2%, 4%, 5%, 8%, 10%, 13%, 15%, 18%, or 20%. An upper limit of the preferable content is 30%, 28%, 25%, 23%, 20%, 18%, 15%, 13%, 10%, 8%, or 5%.

Further, the compound represented by General Formula (M-8) used in the composition of the present invention is preferably, specifically, one of the compounds represented by Formula (M-8.51) to Formula (M-8.54), and among the above, the compound represented by Formula (M-8.52) is preferably contained.

[Chem. 64]

(M-8.51)
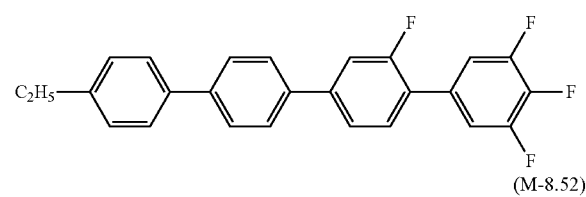

(M-8.52)
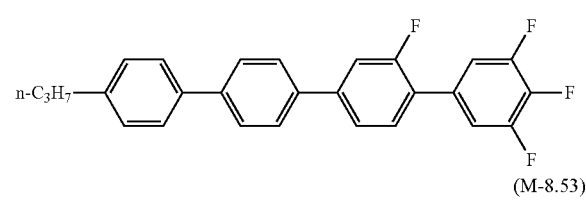

(M-8.53)
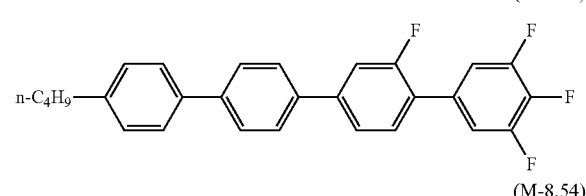

(M-8.54)
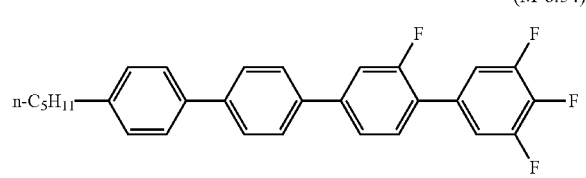

A lower limit of a preferable content of the compounds with respect to a total amount of the composition of the present invention is 1%, 2%, 4%, 5%, 8%, 10%, 13%, 15%, 18%, or 20%. An upper limit of the preferable content is 30%, 28%, 25%, 23%, 20%, 18%, 15%, 13%, 10%, 8%, or 5%.

A lower limit of a preferable total content of the compounds represented by General Formulas (i), (M-1), (M-4), (L), and (M) with respect to a total amount of the composition of the present invention is 80%, 85%, 88%, 90%, 92%, 93%, 94%, 95%, 96%, 97%, 98%, 99%, or 100%. An upper limit of the preferable content is 100%, 99%, 98%, or 95%.

A lower limit of a preferable total content of the compounds represented by General Formula (i), (M-1), (M-4), (L-1) to (L-7), and (M-2) to (M-8) with respect to a total amount of the composition of the present invention is 80%, 85%, 88%, 90%, 92%, 93%, 94%, 95%, 96%, 97%, 98%, 99%, or 100%. An upper limit of the preferable content is 100%, 99%, 98%, or 95%.

The composition of the present invention preferably does not contain a compound having a structure in which oxygen atoms are bonded to each other such as a peracid (—CO—OO—) structure within a molecule.

In a case of putting importance on reliability and long term stability of the composition, the content of the compound having a carbonyl group is preferably 5% or less, more preferably 3% or less, and still more preferably 1% or less with respect to a total mass of the composition, and it is most preferable for the composition not to substantially contain the compound.

In a case of putting importance on stability upon UV irradation, the content of the compound in which a chlorine atom is substituted is preferably 15% or less, preferably 10% or less, preferably 8% or less, more preferably 5% or less, and preferably 3% or less with respect to a total mass of the composition, and it is still more preferable for the composition not to substantially contain the compound.

It is preferable to increase the content of the compound in which the ring structures within a molecule are all 6-membered rings, the content of the compound in which the ring structures within a molecule are all 6-membered rings is preferably 80% or more, more preferably 90% or more, and still more preferably 95% or more with respect to a total mass of the composition, and it is most preferable to compose the composition only of the compound in which the ring structures within a molecule are substantially all 6-membered rings.

In order to suppress degradation of the composition due to oxidization, it is preferable to decrease the content of the compound having a cyclohexenylene group as a ring structure, the content of the compound having a cyclohexenylene group is preferably 10% or less, preferably 8% or less, more preferably 5% or less, and preferably 3% or less with respect to a total mass of the composition, and it is still more preferable for the composition not to substantially contain the compound.

In a case of putting importance on improving viscosity and Tni, it is preferable to decrease the content of the compound having a 2-methylbenzene-1,4-diyl group within a molecule, in which a hydrogen atom may be substituted with halogen, the content of the compound having a 2-methylbenzene-1,4-diyl group within a molecule is preferably 10% or less, preferably 8% or less, more preferably 5% or less, and preferably 3% or less with respect to a total mass of the composition, and it is still more preferable for the composition not to substantially contain the compound.

The meaning of not substantially contain in the present application is that no such substance is contained except those unintentionally-contained substances.

In a case where the compound included in the composition according to a first embodiment of the present invention has an alkenyl group as a side chain, when the alkenyl group bonds to cyclohexane, the number of carbon atoms of the alkenyl group is preferably 2 to 5, and when the alkenyl group bonds to benzene, the number of carbon atoms of the alkenyl group is preferably 4 to 5, and an unsaturated bond of the alkenyl group preferably does not directly bond to benzene.

The composition of the present invention may include a polymerizable compound in order to manufacture a liquid crystal display element of, for example, a PS mode, a horizontal electric field type PSA mode, or a horizontal electric field type PSVA mode. As the polymerizable compound which can be used, a photopolymerizable monomer can be exemplified, in which polymerization proceeds upon irradiation with an energy ray such as light, and a polymerizable compound can be exemplified, which has a liquid crystal skeleton in which a plurality of 6-membered rings are connected with each other, such as a biphenyl derivative and a terphenyl derivative as a structure. More specifically, a bifunctional monomer represented by General Formula (XX).

[Chem. 65]

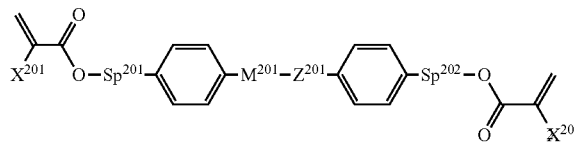

(XX)

(In the formula, $X^{201}$ and $X^{202}$ each independently represent a hydrogen atom or a methyl group, $Sp^{201}$ and $Sp^{202}$ each independently represent a single bond, an alkylene group having 1 to 8 carbon atoms, or —O—$(CH_2)_s$— (in the formula, s represents an integer of 2 to 7, and an oxygen atom bonds to an aromatic ring), $Z^{201}$ represents —$OCH_2$—, —$CH_2O$—, —COO—, —OCO—, —$CF_2O$—, —$OCF_2$—, —$CH_2CH_2$—, —$CF_2CF_2$—, —CH=CH—COO—, —CH=CH—OCO—, —COO—CH=CH—, —OCO—CH=CH—, —COO—$CH_2CH_2$—, —OCO—$CH_2CH_2$—, —$CH_2CH_2$—COO—, —$CH_2CH_2$—OCO—, —COO—$CH_2$—, —OCO—$CH_2$—, —$CH_2$—COO—, —$CH_2$—OCO—, —$CY^1$=$CY^2$—(in the formula, $Y^1$ and $Y^2$ each independently represent a fluorine atom or a hydrogen atom), —C≡C—, or a single bond, and $M^{201}$ represents a 1,4-phenylene group, a trans-1,4-cyclohexylene group, or a single bond, and in all of the 1,4-phenylene groups in the formula, an arbitrary hydrogen atom may be substituted with a fluorine atom.) is preferable.

The diacrylate derivatives in which $X^{201}$ and $X^{202}$ each represents a hydrogen atom and dimethacrylate derivatives in which $X^{201}$ and $X^{202}$ each represents a methyl group are preferable, and the compounds in which one of $X^{201}$ and $X^{202}$ represents a hydrogen atom and the other is a methyl group are also preferable. With regard to the polymerization rate of these compounds, the diacrylate derivative is the fastest, the dimethacrylate derivative is the slowest, and the asymmetric compound is in the middle of the above derivatives, and it is possible to use preferable aspects according to the purpose. In the PSA display element, the dimethacrylate derivative is particularly preferable.

$Sp^{201}$ and $Sp^{202}$ each independently represent a single bond, an alkylene group having 1 to 8 carbon atoms, or —O—$(CH_2)_s$—. However, in the PSA display element, at least one of $Sp^{201}$ and $Sp^{202}$ is preferably a single bond, and a compound is preferable in which both of $Sp^{201}$ and $Sp^{202}$ represent a single bond, or an aspect in which one represents a single bond and the other represents an alkylene group having 1 to 8 carbon atoms or —O—$(CH_2)_s$—. In this case, an alkyl group having 1 to 4 carbon atoms is preferable, and s is preferably 1 to 4.

$Z^{201}$ is preferably —$OCH_2$—, —$CH_2O$—, —COO—, —OCO—, —$CF_2O$—, —$OCF_2$—, —$CH_2CH_2$—, —$CF_2CF_2$—, or a single bond, —COO—, —OCO—, or a single bond is more preferable, and a single bond is particularly preferable.

$M^{201}$ represents a 1,4-phenylene group or a trans-1,4-cyclohexylene group, in which an arbitrary hydrogen atom may be substituted with a fluorine atom, or a single bond, and a 1,4-phenylene group or a single bond is preferable. When C represents a ring structure other than a single bond, $Z^{201}$ is preferably a linking group other than a single bond, and when $M^{201}$ is a single bond, $Z^{201}$ is preferably a single bond.

From this viewpoint, the ring structure between $Sp^{201}$ and $Sp^{202}$ in General Formula (XX) is preferably, specifically, a structure described below.

In General Formula (XX), when $M^{201}$ represents a single bond, and the ring structure is formed by two rings, the ring structure preferably represents Formula (XXa-1) to Formula (XXa-5) described below, more preferably Formula (XXa-1) to Formula (XXa-3), and particularly preferably Formula (XXa-1).

[Chem. 66]

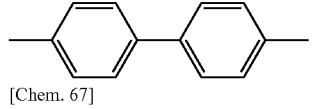

(XXa-1)

[Chem. 67]

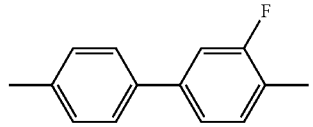

(XXa-2)

[Chem. 68]

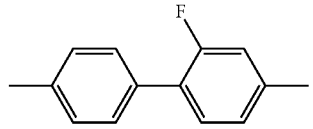

(XXa-3)

[Chem. 69]

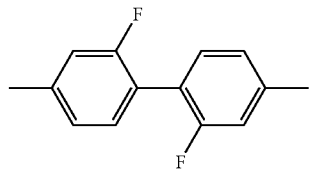

(XXa-4)

[Chem. 70]

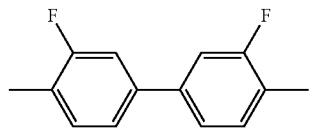

(XXa-5)

(In the formula, both ends bond to $Sp^{201}$ or $Sp^{202}$.)

The polymerizable compound including these skeletons has an alignment regulation force after polymerization, which is optimal for the PSA type liquid crystal display element, and therefore, an excellent alignment state can be obtained. Consequently, display unevenness can be suppressed, or display unevenness does not occur at all.

From the above, as the polymerizable monomer, General Formula (XX-1) to General Formula (XX-4) are particularly preferable, and among the above, General Formula (XX-2) is the most preferable.

[Chem. 71]

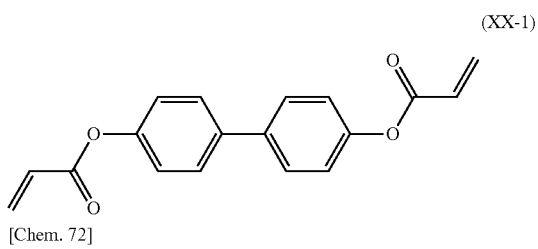

(XX-1)

[Chem. 72]

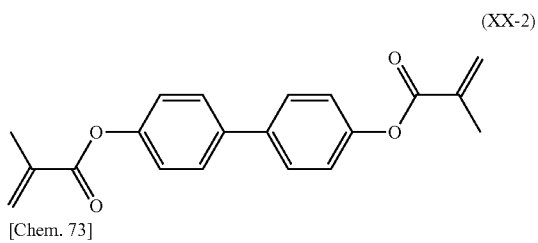

(XX-2)

[Chem. 73]

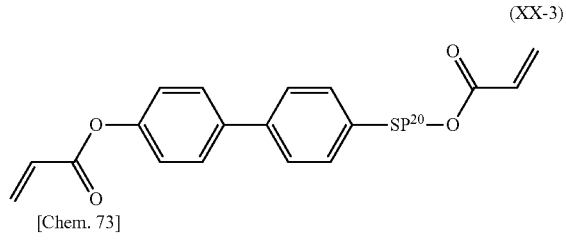

(XX-3)

[Chem. 73]

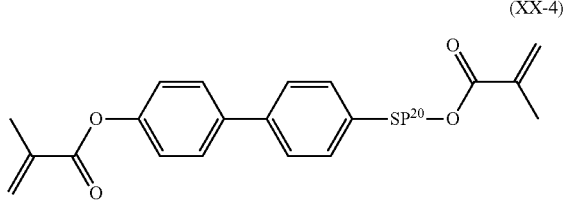

(XX-4)

(In the formula, Sp$^{20}$ represents an alkylene group having 2 to 5 carbon atoms.)

When the monomer is added to the composition of the present invention, polymerization proceeds even in a case where a polymerization initiator does not exist, but the polymerization initiator may be included in order to promote polymerization. The examples of the polymerization initiator include benzoin ethers, benzophenones, acetophenones, benzyl ketals, and acylphosphine oxides.

The composition of the present invention may further include a compound represented by General Formula (Q).

[Chem. 75]

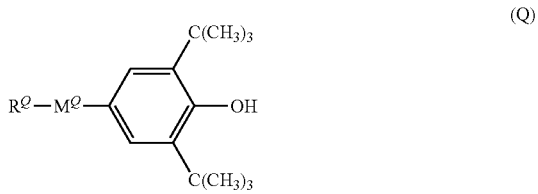

(Q)

(In the formula, R$^Q$ represents a linear alkyl group or a branched alkyl group, each having 1 to 22 carbon atoms, one or more CH$_2$ groups in the alkyl group may be substituted with —O—, —CH=CH—, —CO—, —OCO—, —COO—, —C≡C—, —CF$_2$O—, or —OCF$_2$—, so as not to be directly adjacent to an oxygen atom, and M$^Q$ represents a trans-1,4-cyclohexylene group, a 1,4-phenylene group, or a single bond.)

R$^Q$ represents a linear alkyl group or a branched alkyl group, each having 1 to 22 carbon atoms, one or more CH$_2$ groups in the alkyl group may be substituted with —O—, —CH=CH—, —CO—, —OCO—, —COO—, —C≡C—, —CF$_2$O—, or —OCF$_2$—, so as not to be directly adjacent to an oxygen atom, a linear alkyl group having 1 to 10 carbon atoms, a linear alkoxy group, a linear alkyl group in which one CH$_2$ group is substituted with —OCO— or —COO—, a branched alkyl group, a branched alkoxy group, or a branched alkyl group in which one CH$_2$ group is substituted with —OCO— or —COO— is preferable, and a linear alkyl group having 1 to 20 carbon atoms, a linear alkyl group in which one CH$_2$ group is substituted with —OCO— or —COO—, a branched alkyl group, a branched alkoxy group, or a branched alkyl group in which one CH$_2$ group is substituted with —OCO— or —COO— is more preferable. M$^Q$ represents a trans-1,4-cyclohexylene group, a 1,4-phenylene group, or a single bond, and a trans-1,4-cyclohexylene group or a 1,4-phenylene group is preferable.

The compound represented by General Formula (Q) is preferably, more specifically, one of the compounds represented by General Formula (Q-a) to General Formula (Q-d) described below.

[Chem. 76]

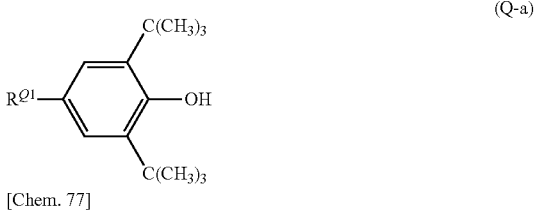

(Q-a)

[Chem. 77]

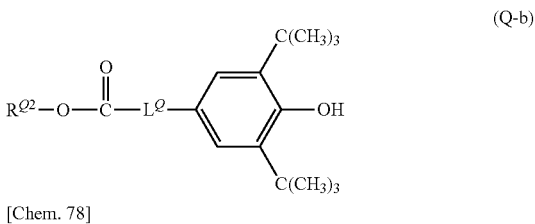

(Q-b)

[Chem. 78]

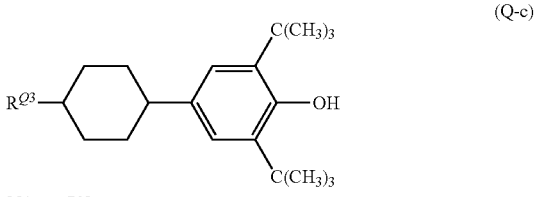

(Q-c)

[Chem. 79]

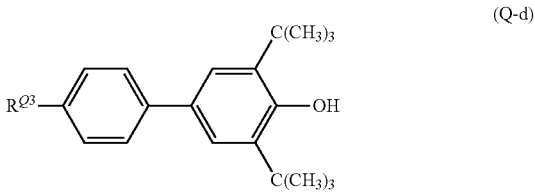

(Q-d)

In the formula, $R^{Q1}$ is preferably a linear alkyl group or a branched alkyl group, each having 1 to 10 carbon atoms, $R^{Q2}$ is preferably a linear alkyl group or a branched alkyl group, each having 1 to 20 carbon atoms, $R^{Q3}$ is preferably a linear alkyl group, a branched alkyl group, a linear alkoxy group or a branched alkoxy group, each having 1 to 8 carbon atoms, $L^Q$ is preferably a linear alkylene group or a branched alkylene group, each having 1 to 8 carbon atoms, and among the compounds represented by General Formula (Q-a) to General Formula (Q-d), the compounds represented by General Formula (Q-c) and General Formula (Q-d) are more preferable.

The composition of the present invention preferably includes one or more compounds represented by General Formula (Q), and more preferably includes one to five types of the compounds, and the content thereof is preferably 0.001% to 1%, more preferably 0.001% to 0.1%, and particularly preferably 0.001% to 0.05%.

Since the polymerizable compound included in the composition is polymerized upon irradiation with an ultraviolet ray, a liquid crystal aligning ability is given, and the composition of the present invention including the polymerizable compound is used for a liquid crystal display element controlling a transmitted light quantity using double refraction of the composition. The composition is useful for, as the liquid crystal display element, an AM-LCD (active matrix liquid crystal display element), a TN (nematic liquid crystal display element), a STN-LCD (super twisted nematic liquid crystal display element), an OCB-LCD, and an IPS-LCD (in plane switching liquid crystal display element), and is particularly useful for the AM-LCD, and can be used for a transmissive or reflective liquid crystal display element can be used.

For two substrates of a liquid crystal cell used in the liquid crystal display element, glass or a transparent material having flexibility such as a plastic can be used for one of them. Meanwhile, an opaque material such as silicon may be used. Transparent substrates having a transparent electrode layer can be obtained by sputtering indium tin oxide (ITO) on the transparent substrates, for example, a glass plate.

A color filter can be created by, for example, a pigment dispersion method, a printing method, an electrodeposition method, or a dyeing method. As one example of the method for creating a color filter using the pigment dispersion method is described. A curable coloring composition for a color filter is applied to the transparent substrates, and the substrates are subjected to a patterning process and cured upon heating or irradiation with light. This step is performed for three colors of red, green, and blue, respectively, thereby creating a pixel unit for a color filter. Moreover, a pixel electrode may be provided in which an active element such as a TFT, a thin film diode, a metallic insulator, and a metal specific resistance element is disposed on the substrates.

The substrates are faced to each other so as to put the transparent electrode layer inside. At that time, an interval of the substrates may be adjusted via a spacer. At this time, the interval is preferably adjusted such that the thickness of the obtained light adjusting layer is 1 µm to 100 µm, and 1.5 µm to 10 µm is more preferable, and when a polarizing plate is used, it is preferable to adjust a product of the refractive index anisotropy Δn and the cell thickness d of the liquid crystal such that the contrast is maximized. In addition, when two pieces of the polarizing plate are used, it is possible to adjust a polarizing axis of each polarizing plate such that a viewing angle or contrast becomes excellent. Further, a phase difference film can be used in order to widen a viewing angle. The examples of the spacer include a columnar spacer composed of glass particles, plastic particles, alumina particles, a photoresist material or the like. After that, a sealant such as an epoxy-based thermosetting composition is screen-printed on the substrates such that a liquid crystal injection port is provided, the substrates are adhered to each other and heated so as to heat and cure the sealant.

As a method for interposing the composition containing a polymerizable compound between two substrates, a common vacuum injection method or ODE method can be used. However, according to the vacuum injection method, drip marks are not generated, but injection marks remain, which is a problem. The present invention can be more appropriately used for a display element manufactured by the ODE method. In the manufacturing step of the liquid crystal display element by the ODE method, an epoxy-based photothermosetting sealant is drawn on any one of the backplane or frontplane substrate in a closed-loop bank shape using a dispenser, a predetermined amount of the composition is added dropwise under a degassed atmosphere, and then the frontplane and the backplane are adhered to each other, thereby manufacturing a liquid crystal display element. It is possible to appropriately use the composition of the present invention, since the composition is stably added dropwise in the ODF process.

As the method for polymerizing the polymerizable compound, it is preferable to polymerize the compound upon irradiation with active energy rays such as an ultraviolet ray or an electron beam singly, in combination, or in order, since an appropriate polymerization rate is desired in order to obtain excellent alignment properties of the liquid crystal. When the ultraviolet ray is used, a polarizing light source may be used, or a nonpolarizing light source may be used. In addition, when polymerization is performed in a state where the composition containing the polymerizable compound is interposed between the two substrates, at least the irradiation side of the substrate should have appropriate transparency with respect to active energy rays. In addition, polymerization may be performed such that after only a predetermined portion is polymerized using a mask upon irradiation with light, an alignment state of the unpolymerized portion is changed by changing conditions such as an electric field, a magnetic field, or a temperature, and irradiation with active energy rays is further performed. In particular, at the time of exposing the compound to an ultraviolet ray, it is preferable to expose the compound to an ultraviolet ray while applying an alternating current electric field to the composition containing the polymerizable compound. As the alternating current electric field to be applied, an alternating current having a frequency of 10 Hz to 10 kHz is preferable, an alternating current having a frequency of 60 Hz to 10 kHz is more preferable, and a voltage is selected depending on a desired pretilt angle of a liquid crystal display element. In other words, the pretilt angle of the liquid crystal display element can be controlled by the voltage to be applied. In the liquid crystal display element for a horizontal electric field type MVA mode, it is preferable to control the pretilt angle to 80 degrees to 89.9 degrees, from a viewpoint of alignment stability and contrast.

It is preferable to set the temperature upon irradiation within a temperature range at which a liquid crystal state of the composition of the present invention is maintained. It is preferable to perform polymerization at a temperature close to room temperature, that is, typically at a temperature of 15° C. to 35° C. As a lamp for generating an ultraviolet ray, a metal halide lamp, a high pressure mercury lamp, or an ultra high pressure mercury lamp can be used. In addition, as a wavelength of the ultraviolet ray used for irradiation, it is preferable to irradiate the compound with an ultraviolet ray in the wavelength range, which is not an absorption wavelength range of the composition, and if necessary, it is preferable to cut the ultraviolet ray for use. An intensity of the ultraviolet ray used for irradiation is preferably 0.1 mW/cm$^2$ to 100 W/cm$^2$, and more preferably 2 mW/cm$^2$ to 50 W/cm$^2$. An energy amount of the ultraviolet ray used for irradiation can be appropriately adjusted, and is preferably 10 mJ/cm$^2$ to 500 J/cm$^2$ are preferable, and more preferably 100 mJ/cm$^2$ to 200 J/cm$^2$. Upon irradiation with an ultraviolet ray, the intensity may be changed. An irradiation time of the ultraviolet ray is appropriately selected depending on the intensity of the ultraviolet ray used for irradiation, and is preferably 10 seconds to 3,600 seconds, and more preferably 10 seconds to 600 seconds.

A liquid crystal display element using the composition of the present invention, in which both high-speed responsiveness and suppression of display defects are obtained, is useful, and in particular, useful for a liquid crystal display element for active matrix driving, and can be applied to a liquid crystal display element for a VA mode, a PSVA mode, a PSA mode, an IPS mode, or an ECB mode.

EXAMPLES

The present invention will be more specifically described below using Examples, but the present invention is not limited to these Examples. In addition, "%" in the compositions of the following Examples and Comparative Examples refers to "%".

In Example, the measured properties are as follows.

$T_{ni}$: Nematic phase-isotropic liquid phase transition temperature (° C.)

Δn: Refractive index anisotropy at 298 K

Δ∈: Dielectric anisotropy at 298 K

η: Viscosity (mPa·s) at 293 K $γ_1$: Rotational viscosity (mPa·s) at 298 K

VHR: Voltage retention rate (%) at 333 K under the condition of a frequency of 60 Hz and an applied voltage of 5 V VHR after heat resistance experiment: After a TEG (test element group) for electro-optical property evacuation in which composition samples are sealed was held in a thermostatic bath of 130° C. for 1 hour, measurement was performed under the same conditions as those of the VHR measurement method described above.

Burn-in:

Evaluation of burn-in of the liquid crystal display element was performed as follows after a predetermined fixed pattern was displayed within a display area for an arbitrary experimental period of time, the experimental period of time, which had elapsed before a residual image of the fixed pattern which was displayed uniformly over the entire screen reached an unacceptable residual image level, was measured.

1) The experimental period of time herein refers to a display time of the fixed pattern, and as this time becomes longer, occurrence of the residual image is suppressed, which indicates that the performance is excellent.

2) Unacceptable residual image level refers to a level, at which a residual image is observed, so that the element is determined as rejected in the acceptance test for shipment.

Example

Sample A: 1,000 hours
Sample B: 500 hours
Sample C: 200 hours
Sample D: 100 hours
The performance is A>B>C>D.

Drip Marks:

Evaluation of drip marks of the liquid crystal display device was performed in the following 5 stages, by visually observing drip marks appeared in white when the entire screen was displayed in black.

5: No drip marks (Excellent)
4: There are extremely slight drip marks, which is an acceptable level (Good)
3: There are slight drip marks, which is a border line level of the acceptance test (Conditional Pass)
2: There are drip marks, which is an unacceptable level (Fail)
1: There are drip marks, which is a very poor level (Poor)

Process Adaptability:

Process adaptability was evaluated as follows: in the ODF process, when liquid crystals were dropped for every 100 times such as "0 times to 100 times, 101 times to 200 times, 201 times to 300 times, . . . " in an amount of 50 pL for 1 time using a constant volume measuring pump, mass of the liquid crystals dropped for every 100 times was measured, and the number of the dropping times at which a variation of the mass reached a value determined as unadaptable for the ODF process was measured.

As the number of the dropping times becomes greater, it is possible to drop the liquid crystals stably for a longer period of time, which can be said that the process adaptability is high.

Example

Sample A: 95,000 times
Sample B: 40,000 times
Sample C: 100,000 times
Sample D: 10,000 times
The performance is C>A>B>D.

Solubility at Low Temperature:

Solubility at low temperature was evaluated as follows: after the composition was prepared, 1 g of the composition was weighed in 2 mL sample bottle, generation of a precipitate from the composition was visually observed, while continuously changing a temperature with the next operation state "−20° C. (maintained for 1 hour)→raising a temperature (0.1° C./minute) 0° C. (maintained for 1 hour)→raising a temperature (0.1° C./minute) 20° C. (maintained for 1 hour)→decreasing a temperature (−0.1° C./minute)→0° C. (maintained for 1 hour)→decreasing a temperature (−0.1° C./minute)→−20° C." as one cycle in a temperature controlling type experiment bath, and the experiment time when the precipitate was observed was measured.

As the experiment time becomes longer, a liquid crystal phase is maintained stably for a longer period of time, which means excellent solubility at low temperature.

Example

Sample A: 72 hours
Sample B: 600 hours
Sample C: 384 hours
Sample D: 1,440 hours
The performance is D>B>C>A.

Volatility/Stain Resistance of Manufacturing Device:

Evaluation of volatility of the liquid crystal material was performed as follows: an operation state of a vacuum agitation defoaming mixer was observed using a stroboscope, and foaming of the liquid crystal material was visually observed. Specifically, 0.8 kg of the composition was put into an exclusive container for a vacuum agitation defoaming mixer having a volume of 2.0 L, the vacuum agitation defoaming mixer was operated under a degassed atmosphere of 4 kPa, at a revolution speed of 15 S-1, and at a rotation speed of 7.5S-1, and the time until the foaming started was measured.

As the time until the foaming is started becomes longer, the liquid crystal material hardly volatilizes, and the manufacturing device is less stained, which indicates excellent performance.

Example

Sample A: 200 seconds
Sample B: 45 seconds
Sample C: 60 seconds
Sample D: 15 seconds
The performance is A>C>B>D.

In addition, the following abbreviations are used for describing the compounds in Examples.

(Ring Structure)

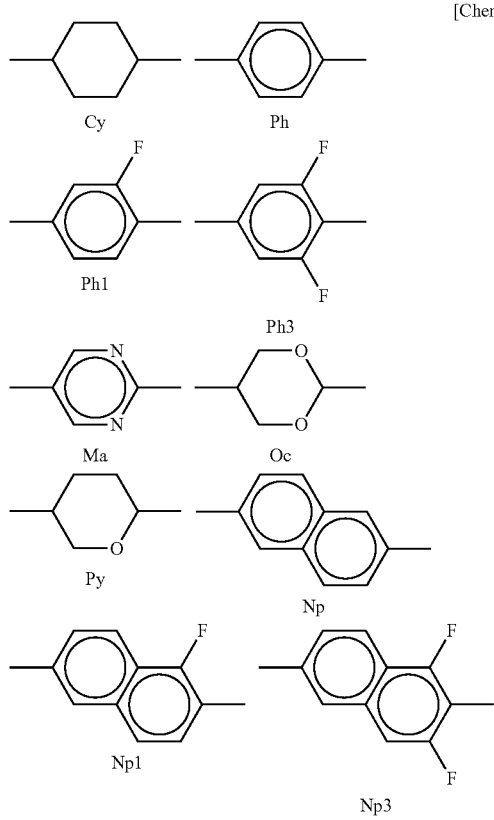

[Chem. 80]

(Side Chain Structure and Linking Structure)

TABLE 1

| n(number) of terminal | $C_nH_{2n+1}$— |
| --- | --- |
| -nd0FF- | —$(CH_2)_{n-1}$—HC=CFF |
| -2- | —$CH_2CH_2$— |
| -1O- | —$CH_2O$— |
| -O1- | —$OCH_2$— |
| -V- | —CO— |

TABLE 1-continued

| -VO- | —COO— |
| --- | --- |
| CFFO | $CF_2O$ |
| -F | —F |
| -Cl | —Cl |
| -OCFFF | —$OCF_3$ |
| -CFFF | —$CF_3$ |
| -On | —$OC_nH_{2n+1}$ |
| ndm- | $C_nH_{2n+1}$—HC=CH—$(CH_2)_{m-1}$— |
| -ndm | —$(CH_2)_{n-1}$—HC=CH—$(CH_2)_m$— |
| -Ondm | —O—$(CH_2)_{n-1}$—HC=CH— |
| -ndm- | —$(CH_2)_{n-1}$—HC=CH—$(CH_2)_{m-1}$ |
| -CN | —C≡N |
| -T- | —C≡C— |

Example 1 and Comparative Examples 1 to 3

The composition of Example 1 includes compounds represented by General Formulas (i), (M-1), and (M-4). The composition of Example 1 includes the compound represented by Formula (m-6.32) as the compound represented by General Formula (i).

The composition of Comparative Example 1 does not include the compound represented by General Formula (i); however, it is understood that a value of η is considerably increased, compared to the composition of Example 1.

The composition of Comparative Example 2 does not include the compound represented by General Formula (M-1); however, it is understood that Δ∈ is decreased and η is increased, compared to the composition of Example 1.

The composition of Comparative Example 3 does not include the compound represented by General Formula (M-4); however, it is understood that Tni and Δ∈ are decreased, compared to the composition of Example 1.

TABLE 2

|  | Example 1 | Comparative Example 1 | Comparative Example 2 | Comparative Example 3 |
| --- | --- | --- | --- | --- |
| Tni | 68.6 | 74 | 73.5 | 58.1 |
| Δn | 0.1 | 0.107 | 0.101 | 0.092 |
| Δ∈ | 10.83748 | 12.34616 | 10.2424 | 10.11646 |
| η | 17.31923 | 23.67692 | 18.19615 | 11.98462 |
| γ1 | 95.55 | 101.2375 | 143.325 | 60.2875 |
| (M-6.32) | 10 |  | 15 | 15 |
| (M-1.2) | 10 | 15 |  | 15 |
| (M-4.3) | 5 | 8 | 8 |  |
| (M-4.4) | 5 | 7 | 7 |  |
| (M-2.3) | 5 | 5 | 5 | 5 |
| (M-3.2) | 5 | 5 | 5 | 5 |
| (M-5.2) | 5 | 5 | 5 | 5 |
| (L-1-1.3) | 15 | 15 | 15 | 15 |
| (L-1-2.2) | 30 | 30 | 30 | 30 |
| (L-4.2) | 10 | 10 | 10 | 10 |

Examples 2 to 4

TABLE 3

|  | Example 2 | Example 3 | Example 4 |
| --- | --- | --- | --- |
| Tni | 60.8 | 61.2 | 70 |
| Δn | 0.099 | 0.113 | 0.118 |
| Δ∈ | 4.4 | 7.6 | 10.3 |
| γ1 | 38 | 54 | 73 |
| (L-1-2.2) | 50 | 40 | 30 |
| (L-1-1.3) | 10 | 10 | 10 |
| (L-6.1) | 8 | 8 | 8 |
| (L-6.2) | 8 | 8 | 8 |

TABLE 3-continued

|  | Example 2 | Example 3 | Example 4 |
|---|---|---|---|
| (L-5.1) | 4 | 4 | 4 |
| (M-3.1) | 5 | 5 | 5 |
| (M-3.2) | 5 | 5 | 5 |
| (M-8.52) |  | 3 | 3 |
| (M-6.32) | 10 | 10 | 10 |
| (M-4.2) |  | 3 | 3 |
| (M-1.2) |  | 4 | 4 |
| (M-8.12) |  |  | 3 |
| (M-2.3) |  |  | 7 |

Examples 5 to 7

TABLE 4

|  | Example 5 | Example 6 | Example 7 |
|---|---|---|---|
| Tni | 87.3 | 88.8 | 87.6 |
| Δn | 0.112 | 0.12 | 0.111 |
| Δε | 13.7 | 14.4 | 13.7 |
| η | 21 | 24 | 20 |
| (M-1.2) | 2 | 2 | 2 |
| (L-1-1.3) | 10 | 10 | 10 |
| (L-1-2.2) | 35 | 30 | 35 |
| (M-4.2) | 2 | 7 | 2 |
| (M-2.3) | 5 | 5 | 5 |
| (L-4.2) | 10 | 10 | 10 |
| (M-4.3) | 5 | 5 | 5 |
| (M-4.4) | 10 | 5 | 8 |
| (M-6.32) | 8 | 8 | 10 |
| (M-3.1) | 6 | 6 | 6 |
| (M-3.2) | 7 | 7 | 7 |
| (L-6.6) |  | 5 |  |

Examples 8 to 10

TABLE 5

|  | Example 8 | Example 9 | Example 10 |
|---|---|---|---|
| Tni | 76.1 | 75.3 | 73.5 |
| Δn | 0.099 | 0.096 | 0.094 |
| Δε | 10.0 | 9.4 | 10.0 |
| η | 15.3 | 14.0 | 13.8 |
| (M-1.2) | 5 | 5 | 5 |
| (L-1-1.3) | 15 | 15 | 15 |
| (L-1-2.2) | 30 | 30 | 30 |
| (M-2.3) | 5 | 5 | 5 |
| (L-4.2) | 12 | 12 | 8 |
| (M-4.3) | 5 | 5 | 5 |
| (M-8.12) | 2 | 2 | 2 |
| (M-3.2) | 6 | 3 | 3 |
| (M-4.4) | 3 | 3 | 3 |
| (M-5.2) | 6 | 6 | 5 |
| (M-6.31) | 5 | 5 | 5 |
| (M-6.32) | 6 | 6 | 5 |
| (M-5.23) |  | 3 | 9 |

Examples 11 to 13

TABLE 6

|  | Example 11 | Example 12 | Example 13 |
|---|---|---|---|
| Tni | 109.2 | 109.8 | 108.7 |
| Δn | 0.130 | 0.130 | 0.130 |
| Δε | 8.1 | 8.2 | 8.0 |

TABLE 6-continued

|  | Example 11 | Example 12 | Example 13 |
|---|---|---|---|
| (M-1.2) | 5 | 5 | 5 |
| (L-1-1.3) | 10 | 10 | 10 |
| (L-4.1) | 15 | 15 | 15 |
| (M-4.2) | 2 | 2 | 2 |
| (L-4.2) | 10 | 10 | 10 |
| (L-6.1) | 3 | 3 | 3 |
| (M-4.3) | 5 | 5 | 3 |
| (L-1-2.4) | 10 | 10 | 10 |
| (M-4.4) | 3 | 3 | 3 |
| (L-1-2.3) | 10 | 10 | 10 |
| (L-7.33) | 5 | 5 | 5 |
| (L-7.34) | 5 | 5 | 5 |
| (L-2.6) | 5 | 5 | 5 |
| (M-7.12) | 7 | 7 | 9 |
| (M-3.1) | 5 | 2 | 5 |
| (M-3.2) |  | 3 |  |

Evaluations of the compositions of Examples 1, 2, and 4 are shown below.

TABLE 7

|  | Example 1 | Example 2 | Example 5 |
|---|---|---|---|
| Initial VHR | 99.5 | 99.3 | 99.3 |
| VHR after heating | 98.3 | 98.2 | 98.4 |
| Burn-in | A | A | A |
| Drip marks | 5 | 5 | 5 |
| Process Adaptability | C | C | C |
| Solubility at low temperature | D | D | D |
| Volatility/Stain Resistance of Manufacturing Device | A | A | A |

It is understood that the composition of the present application is excellent.

The invention claimed is:

1. A composition comprising:
one or more compounds represented by General Formula (i);
one or more compounds represented by General Formula (M-1);
one or more compounds represented by General Formula (M-4); and
one or more compounds represented by General Formula (M-3),

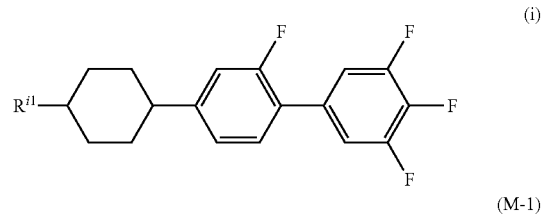

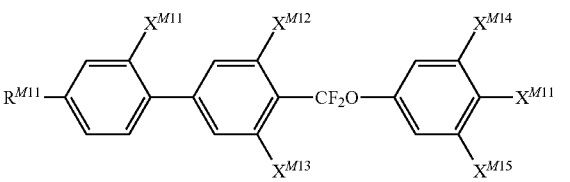

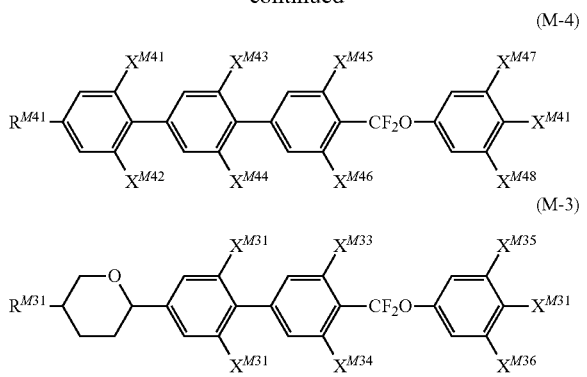

(M-4)

(M-3)

wherein $R^{i1}$, $R^{M11}$, and $R^{M41}$ each independently represent an alkyl group having 1 to 8 carbon atoms, $X^{M11}$ to $X^{M15}$ and $X^{M41}$ to $X^{M48}$ each independently represent a hydrogen atom, a fluorine atom, or a chlorine atom, $Y^{M11}$ and $Y^{M41}$ each independently represent a fluorine atom or —$OCF_3$, $R^{M31}$ represents an alkyl group having 1 to 5 carbon atoms, an alkenyl group having 2 to 5 carbon atoms, or an alkoxy group having 1 to 4 carbon atoms, $X^{M31}$ to $X^{M36}$ each independently represent a hydrogen atom, or a fluorine atom, and $Y^{M31}$ represents a fluorine atom, a chlorine atom, or $OCF_3$.

2. The composition according to claim 1, wherein $R^{i1}$, $R^{M11}$, and $R^{M41}$ represent a propyl group.

3. The composition according to claim 1, further comprising one or more compounds represented by General Formula (L):

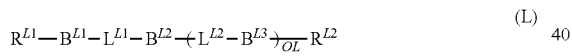

wherein $R^{L1}$ and $R^{L2}$ each independently represent an alkyl group having 1 to 8 carbon atoms, and one —$CH_2$— or two or more non-adjacent —$CH_2$—'s in the alkyl group each independently may be substituted with —CH=CH—, —C≡C—, —O—, —CO—, —COO—, or —OCO—, OL represents 0, 1, 2, or 3, $B^{L1}$, $B^{L2}$, and $B^{L3}$ each independently represent a group selected from the group consisting of (a) a 1,4-cyclohexylene group (one —$CH_2$— or two or more non-adjacent —$CH_2$—'s existing in this group may be substituted with —O—) and (b) a 1,4-phenylene group (one —CH= or two or more non-adjacent —CH='s existing in this group may be substituted with —N=), and the group (a) and the group (b) each independently may be substituted with a cyano group, a fluorine atom, or a chlorine atom, $L^{L1}$ and $L^{L2}$ each independently represent a single bond, —$CH_2CH_2$—, —$(CH_2)_4$—, —$OCH_2$—, —$CH_2O$—, —COO—, —OCO—, —$OCF_2$—, —$CF_2O$—, —CH=N—N=CH—, —CH=CH—, —CF=CF—, or —C≡C—, and when OL is 2 or 3 and a plurality of $L^{L2}$'s exist, the plurality of $L^{L2}$'s may be the same as or different from each other, and when OL is 2 or 3 and a plurality of $B^{L3}$'s exist, the plurality of $B^{L3}$'s may be the same as or different from each other.

4. The composition according to claim 1, further comprising one or more compounds represented by General Formula (M):

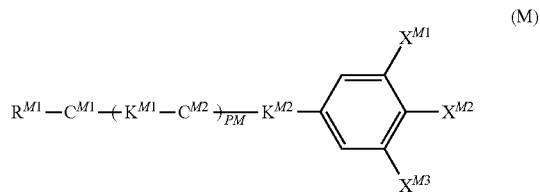

wherein $R^{M1}$ represents an alkyl group having 1 to 8 carbon atoms, and one —$CH_2$— or two or more non-adjacent —$CH_2$—'s in the alkyl group each independently may be substituted with —CH=CH—, —C≡C—, —O—, —CO—, —COO—, or —OCO—, PM represents 0, 1, 2, 3, or 4, $C^{M1}$ and $C^{M2}$ each independently represent a group selected from the group consisting of (d) a 1,4-cyclohexylene group (one —$CH_2$— or two or more non-adjacent —$CH_2$—'s existing in this group may be substituted with —O— or —S—) and (e) a 1,4-phenylene group (one —CH= or two or more non-adjacent —CH='s existing in this group may be substituted with —N=), and the group (d) and the group (e) each independently may be substituted with a cyano group, a fluorine atom, or a chlorine atom, $K^{M1}$ and $K^{M2}$ each independently represent a single bond, —$CH_2CH_2$—, —$(CH_2)_4$—, —$OCH_2$—, —$CH_2O$—, —$OCF_2$—, —$CF_2O$—, —COO—, —OCO—, or —C≡C—, when PM is 2, 3, or 4 and a plurality of $K^{M1}$'s exist, the plurality of $K^{M1}$'s may be the same as or different from each other, and when PM is 2, 3, or 4 and a plurality of $C^{M2}$'s exist, the plurality of $C^{M2}$'s may be the same as or different from each other, $X^{M1}$ and $X^{M3}$ each independently represent a hydrogen atom, a chlorine atom, or a fluorine atom, and $X^{M2}$ represents a hydrogen atom, a fluorine atom, a chlorine atom, a cyano group, a trifluoromethyl group, a fluoromethoxy group, a difluoromethoxy group, a trifluoromethoxy group, or a 2,2,2-trifluoroethyl group, provided that the compound represented by General Formula (i), the compound represented by General Formula (M-1), the compound represented by General Formula (M-4), and the compound represented by General Formula (M-3) are excluded.

5. A liquid crystal display element comprising the composition according to claim 1.

6. An IPS element or an FFS element comprising the composition according to claim 1.

7. The composition according to claim 1, wherein an unsaturated bond of the alkenyl group of any compound included in the composition does not directly bond to a benzene ring.

8. The composition according to claim 1, wherein in a case where a compound included in the composition has an alkenyl group as a side chain, when the alkenyl group bonds to benzene, an unsaturated bond of the alkenyl group does not directly bond to the benzene.

9. The composition according to claim 1, wherein the compound has a number of carbon atoms of the alkenyl group is 4 or 5.

* * * * *